United States Patent
Jia et al.

(10) Patent No.: US 12,435,283 B2
(45) Date of Patent: Oct. 7, 2025

(54) HIGH ACTIVITY HYDROTREATING CATALYSTS AND PROCESSES USING SAME

(71) Applicant: Advanced Refining Technologies LLC, Columbia, MD (US)

(72) Inventors: Jifei Jia, Hercules, CA (US); Bi-Zeng Zhan, Albany, CA (US); Michael Manto, Tinley Park, IL (US)

(73) Assignee: Advanced Refining Technologies LLC, Columbia, MD (US)

(*) Notice: Subject to any disclaimer, the term of this patent is extended or adjusted under 35 U.S.C. 154(b) by 185 days.

(21) Appl. No.: 18/260,765

(22) PCT Filed: Jan. 5, 2022

(86) PCT No.: PCT/US2022/011288
§ 371 (c)(1),
(2) Date: Jul. 7, 2023

(87) PCT Pub. No.: WO2022/150366
PCT Pub. Date: Jul. 24, 2022

(65) Prior Publication Data
US 2024/0059985 A1 Feb. 22, 2024

Related U.S. Application Data

(60) Provisional application No. 63/135,167, filed on Jan. 8, 2021.

(51) Int. Cl.
C10G 49/04 (2006.01)
B01J 21/12 (2006.01)
(Continued)

(52) U.S. Cl.
CPC ............ *C10G 49/04* (2013.01); *B01J 21/12* (2013.01); *B01J 23/883* (2013.01); *B01J 27/19* (2013.01);
(Continued)

(58) Field of Classification Search
CPC .. Y02T 10/72; B01J 21/04; B01J 21/12; B01J 23/85; B01J 23/883; B01J 27/19;
(Continued)

(56) References Cited

U.S. PATENT DOCUMENTS 1,870,357 A 8/1932 Dierichs
2,583,637 A 1/1952 Draper
(Continued)

FOREIGN PATENT DOCUMENTS

CN 104053500 A 9/2014
EP 0590894 3/1998
(Continued)

OTHER PUBLICATIONS

JP Office Action for JP App. No. 2023-541662, dated Oct. 10, 2024, 14 pages.
(Continued)

*Primary Examiner* — Ellen M McAvoy
*Assistant Examiner* — Chantel Graham
(74) *Attorney, Agent, or Firm* — DORITY & MANNING, P.A.

(57) ABSTRACT

A supported catalyst for hydroprocessing, hydrotreating or hydrocracking hydrocarbon feedstocks, the supported catalyst comprising at least one metal from Group 6 and at least one metal from Groups 8, 9, or 10 of the Periodic Table of the Elements, and optionally comprising phosphorous. The Group 6 metal comprises about 30 to about 45 wt. % and the total of Group 6 and Group 8, 9, or 10 or mixtures thereof metal components comprise about 35 to about 55 wt. %, calculated as oxides and based on the total weight of the catalyst composition. The metals, and phosphorous when present, are carried on and/or within a porous inorganic oxide carrier or support, the support prior to incorporation of the metals and phosphorus, having a total pore volume
(Continued)

(TPV) of about 0.8 cc/g to about 1.5 cc/g and comprising a defined pore size distribution and wherein the supported catalyst comprises a defined pore size distribution.

20 Claims, 13 Drawing Sheets

(51) Int. Cl.
| | |
|---|---|
| *B01J 23/883* | (2006.01) |
| *B01J 27/19* | (2006.01) |
| *B01J 35/61* | (2024.01) |
| *B01J 35/63* | (2024.01) |
| *B01J 35/64* | (2024.01) |
| *B01J 37/00* | (2006.01) |
| *B01J 37/02* | (2006.01) |
| *B01J 37/08* | (2006.01) |

(52) U.S. Cl.
CPC ........... *B01J 35/615* (2024.01); *B01J 35/633* (2024.01); *B01J 35/638* (2024.01); *B01J 35/647* (2024.01); *B01J 35/651* (2024.01); *B01J 35/653* (2024.01); *B01J 35/657* (2024.01); *B01J 37/0018* (2013.01); *B01J 37/0203* (2013.01); *B01J 37/082* (2013.01); *C10G 2300/1085* (2013.01); *C10G 2300/1096* (2013.01)

(58) Field of Classification Search
CPC ...... B01J 35/615; B01J 35/633; B01J 35/635; B01J 35/638; B01J 35/647; B01J 35/66; B01J 37/0018; B01J 37/0201; B01J 37/0203; B01J 37/082; B01J 35/651; B01J 35/653; B01J 35/657; C10G 2300/1085; C10G 2300/1096; C10G 2300/202; C10G 2300/302; C10G 2300/308; C10G 45/08; C10G 45/50; C10G 49/04

See application file for complete search history.

(56) References Cited

U.S. PATENT DOCUMENTS

| | | | |
|---|---|---|---|
| 3,403,109 | A | 9/1968 | Dennis et al. |
| 4,395,329 | A | 7/1983 | Le Page et al. |
| 4,456,701 | A | 6/1984 | Chen |
| 4,587,012 | A | 5/1986 | Quann |
| 4,900,711 | A | 2/1990 | Nebesh et al. |
| 5,468,371 | A | 11/1995 | Nelson et al. |
| 5,545,602 | A | 8/1996 | Nelson et al. |
| 5,609,750 | A | 3/1997 | Nat et al. |
| 5,928,499 | A | 7/1999 | Sherwood et al. |
| 7,473,663 | B2 | 1/2009 | Jones et al. |
| 7,803,266 | B2 | 9/2010 | Guillaume et al. |
| 8,969,242 | B2 | 3/2015 | Klein et al. |
| 8,980,789 | B2 | 3/2015 | Zhou et al. |
| 9,364,816 | B2 | 6/2016 | Eijsbouts-Spickova et al. |
| 9,605,216 | B2 | 3/2017 | Klein et al. |
| 10,369,558 | B2 | 8/2019 | Yu et al. |
| 10,370,600 | B2 | 8/2019 | Yu et al. |
| 10,376,873 | B2 | 8/2019 | Yu et al. |
| 10,569,254 | B2 | 2/2020 | Klein et al. |
| 2003/0111391 | A1 | 6/2003 | Bhan |
| 2005/0211603 | A1 | 9/2005 | Guillaume et al. |
| 2007/0175797 | A1 | 8/2007 | Iki et al. |
| 2014/0001090 | A1 | 1/2014 | Yang et al. |
| 2014/0367311 | A1 | 12/2014 | Yu et al. |
| 2016/0017240 | A1 | 1/2016 | Duma et al. |
| 2017/0165639 | A1* | 6/2017 | Klein ................... C10G 47/10 |
| 2019/0184376 | A1 | 6/2019 | Plecha et al. |
| 2020/0055033 | A1 | 2/2020 | Ginestra et al. |

FOREIGN PATENT DOCUMENTS

| | | |
|---|---|---|
| EP | 2143777 | 1/2010 |
| JP | 2008-212798 | 9/2008 |
| JP | 2018-069241 | 10/2018 |
| WO | WO 2007/070394 | 6/2007 |
| WO | WO 2013/032628 | 3/2013 |

OTHER PUBLICATIONS

European Search Report and Written Opinion for EP App. No. 227378033.5, mailed Nov. 18, 2024, 9 pages.
Rahul Singh, "Ticking All the Right Boxes", Hydrocarbon Engineering, Mar. 2020, 4 pages.
Eijsbouts et al., "The effect of phosphate on the hydrodenitrogenation activity and selectivity of alumina-supported sulfided Mo, Ni, and Ni—Mo catalysts", Journal of Catalysis, vol. 131(2), Oct. 1991, pp. 412-432.
Henrik Topsoe, "The role of Co—Mo—S type structures in hydrotreating catalysts", Applied Catalysis A: General, vol. 322, Apr. 16, 2007, pp. 3-8.
Klimov et al., "CoMoB/Al2O3 catalysts for hydrotreating of diesel fuel. The effect of the way of the boron addition to a support or an impregnating solution", Catalysis Today, vol. 305, May 1, 2018, pp. 192-202.
Foreign Office Action and Search Report on TW patent application No. 111100745 dated Sep. 6, 2022.
International Search Report and Written Opinion from PCT/US2022/011288 dated May 13, 2022, 12 pages.

* cited by examiner

HIGH ACTIVITY HYDROTREATING CATALYSTS AND PROCESSES USING SAME

CROSS-REFERENCE TO RELATED APPLICATIONS

This application is a U.S. National Stage of International Patent Application No. PCT/US2022/011288, filed Jan. 5, 2022, which claims the benefit of priority to U.S. Provisional Patent Application No. 63/135,167, filed on Jan. 8, 2021, the contents of which are incorporated herein by reference in their entireties.

BACKGROUND

There is a continuing need in the petroleum industry for improved catalyst supports and supported catalysts derived therefrom, exhibiting enhanced activity, improved catalyst life and a desirable balance of morphological properties for use in hydrotreating hydrocarbon feedstocks.

Porous inorganic carriers in particulate form are useful as catalyst supports and for preparing supported catalysts. Such supported catalysts comprise catalytically active metals, metal oxides, non-metals and other metal compounds based on elements of various groups of the Periodic Table. The concentration and distribution of the metals and elements on the support, as well as the properties of the support itself are representative parameters that influence the complex nature of catalytic activity and catalyst life.

For supported catalysts used in hydrotreating hydrocarbon feedstocks, the morphological properties of the support, such as surface area, pore volume, pore size and pore size distribution of the pores that comprise the total pore volume are important. Such properties can influence the nature and concentration of active catalytic sites, the diffusion of the reactants to the active catalyst site, the diffusion of products from the active sites and catalyst life. In addition, the support and its dimensions also influence the mechanical strength, density, and reactor packing characteristics, all of which are important in commercial applications.

Hydroprocessing catalysts in petroleum refining represent a large segment of supported catalysts such as those based on the use of alumina and silica-alumina in commercial use and such hydroprocessing applications span a wide range of feed types and operating conditions, but have one or more common objectives, namely, removal of heteroatom impurities, including for example sulfur-containing compounds, nitrogen-containing compounds, metal-containing compounds (sometimes referred to as sulfur, nitrogen and metals), asphaltenes, carbon residue, sediment precursors, and mixtures thereof, as well as increasing the hydrogen to carbon (H/C) ratio in the products and reducing aromatics, density and/or carbon residues, as well as cracking carbon bonds to reduce boiling range and average molecular weight and desirably reducing product viscosity.

As refiners increase the proportion of heavier, poorer quality crude oil in the feedstock to be processed, the need increases for processes and catalysts to treat fractions containing increasingly higher levels of metals, asphaltenes, aromatics, nitrogen, and sulfur. If a catalyst, such as a resid desulfurization catalyst or a vacuum gas oil (VGO) hydrocracking pretreat catalyst, is exposed to a hydrocarbon fraction containing undesirable metals and aromatics, the catalyst can be rapidly deactivated and thus susceptible to premature replacement.

VGO hydrocracking is a catalytic chemical process that converts high-boiling constituent hydrocarbons in petroleum crude oils to more valuable lower-boiling products such as gasoline, kerosene, jet fuel, and diesel oil. Typically, the process takes place in a hydrogen-rich atmosphere at elevated temperatures (for example, 260-425° C.) and pressures (35-200 bar or 3.5-20 MPa). A VGO hydrocracking pretreat catalyst is typically placed in front of a hydrocracking catalyst and it hydrotreats VGO by reducing its content of organic nitrogen, organic sulfur and aromatic compounds.

In general, it has been desirable to design a hydroprocessing catalyst exhibiting a high surface area in order maximize the concentration of catalytic sites and activity. However, surface area and pore diameter are inversely related within practical limits. Consequently, a catalyst support, such as one comprising alumina or silica-alumina particles, containing predominantly small pores will exhibit the highest surface area. In contrast, sufficiently large pores are required for diffusion of feedstock components, particularly as the catalyst ages and fouls, but larger pores have a lower surface area. More specifically, the catalyst formulator or designer as well as the process engineer is faced with competing considerations which often dictate a balance of morphological properties for a support as well as supported catalysts derived therefrom.

While pores having a diameter in the range below about 200 Angstroms (Å) (20 nm) have the effect of increasing the number of active sites of alumina or silica-alumina hydrogenation catalysts, such sites can be susceptible to being clogged by coke thereby causing a reduction in catalyst activity. Conversely, when supported catalysts have more than about 10% of their total pore volume occupied by pores having a pore diameter greater than 1000 Å (100 nm), mechanical crush strength and activity of the supported catalyst may be adversely affected. Furthermore, for some alumina or silica-alumina catalysts, maximizing the concentration of pores having a pore diameter of from 200 Å (20 nm) to less than 1000 Å (100 nm), for purposes of the present invention within the region referred to as the mesopore region, can provide a balance of activity and catalyst life.

Thus, while increasing the surface area of a catalyst can increase the number of the active sites, such surface area increase results in an increase of the proportion of smaller pores which may be more susceptible to being clogged by coke and other components present in a hydrocarbon feed. In short, increasing surface area and maximizing the concentration of supported catalysts exhibiting pore diameters in the mesopore range are antagonistic properties. Moreover, not only is high surface area desirable, but it should also remain stable when exposed to petroleum feedstock conversion conditions such as high temperature and moisture. Therefore, there is a continuing search for stable carrier particles that exhibit a combination of pore size distribution and total surface area that can provide a combination of performance characteristics suitable for use as catalyst supports, particularly when used to support catalytically active metals for producing hydroprocessing catalysts.

Furthermore, the physical and chemical properties of a porous carrier can depend on the procedures followed in its preparation and many processes have been developed in attempts to optimize carrier properties for their use as catalyst supports. Examples of suitable porous carrier materials and methods of preparation are described hereinbelow. Generally, an alumina support can be prepared by combining a water-soluble, acidic aluminum containing compound or aluminum salt, such as aluminum sulfate, aluminum nitrate, or aluminum chloride, and an alkali metal aluminate such as sodium or potassium aluminate to form a precipitate, which is then further dried and typically calcined. Thus, while catalyst carriers, including alumina carriers, are known, further improvements are needed in order to provide carriers having still further improved properties.

SUMMARY

A supported catalyst comprising at least one metal from Group 6, alternatively referred to as Group VIB, of the Periodic Table of the Elements, at least one metal from Groups 8, 9 or 10, alternatively referred to as Group VIIIB, of the Periodic Table of the Elements, and optionally comprising phosphorous; wherein the Group 6 metal comprises about 30 to about 45 wt. % and the total of Group 6 and Group 8, 9 or 10 or mixtures thereof metal components comprise about 35 to about 55 wt. %, calculated as oxides and based on the total weight of the catalyst composition; wherein the metals, and phosphorous when present, are carried on and/or within a porous inorganic oxide carrier or support, the support prior to incorporation of the metals and phosphorus when present, having a total pore volume (TPV) of about 0.8 cc/g to about 1.5 cc/g and comprising: (a) equal to or greater than about 25% to about 45% of TPV in pores having a diameter of 100 Angstroms (Å) to 200 Angstroms (Å) (20 nm); (b) greater than about 15% to less than about 30% of TPV in pores having a diameter of 200 Å (20 nm) to less than 1000 Å (100 nm); (c) equal to or greater than 10% to less than 30% of TPV in pores having a diameter equal to or greater than 1000 Å (100 nm) to 30,000 Å (3,000 nm); and wherein the supported catalyst comprises: (d) equal to or greater than about 35% to about 60% of TPV in pores having a diameter of 100 Å (10 nm) to 200 Å (20 nm); (e) greater than about 15% to less than about 30% of TPV in pores having a diameter of 200 Å (20 nm) to less than 1000 Å (100 nm); (f) equal to or greater than 10% to less than 30% of TPV in pores having a diameter of 1000 Å (100 nm) to 30,000 Å (3,000 nm); and wherein pore properties and contents are measured using mercury porosimetry.

Another embodiment comprises porous inorganic oxide carriers or supports, having a total pore volume (TPV) of about 0.8 cc/g to about 1.5 cc/g and comprising: (a) equal to or greater than about 25% to about 45% of TPV in pores having a diameter of 100 Angstroms (Å) (10 nm) to 200 Å (20 nm); (b) greater than about 15% to less than about 30% of TPV in pores having a diameter of 200 Å (20 nm) to less than 1000 Å (100 nm); (c) equal to or greater than 10% to less than 30% of TPV in pores having a diameter of 1000 Å (100 nm) to 30,000 Å (3,000 nm).

Further embodiments comprise processes for treating a hydrocarbon feedstock comprising at least one of paraffin, aromatic and naphthene components to produce treated products, the process selected from the group consisting of: (I) hydrodemetallation, hydrodenitrification, hydrodesulfurization, hydrodearomatization, and hydrocracking, the process comprising contacting the feedstock in at least one reactor with hydrogen under hydroprocessing or hydrocracking conditions with a supported catalyst as described above and recovering the product; (II) hydrotreating the hydrocarbon feed containing components boiling above 600° F. (315.6° C.), and at least one component selected from the group consisting of sulfur-containing compounds, nitrogen-containing compounds, metal-containing compounds, asphaltenes, carbon residue, sediment precursors, and mixtures thereof, comprising contacting the feed with hydrogen and a supported catalyst as described above at isothermal or substantially isothermal hydrotreating conditions and recovering the treated product; (III) hydroconverting the hydrocarbon feed having components exhibiting a boiling point greater than 600° F. (315.6° C.) to form product having an increased proportion of components exhibiting a boiling point less than about 600° F. (315.6° C.) comprising contacting the feed with hydrogen and a supported catalyst as described above at isothermal or substantially isothermal hydrotreating conditions and recovering the product; and (IV) hydroconverting the feed, comprising contacting the feed comprising a hydrocarbon oil with hydrogen and a supported catalyst as described above under conditions of elevated temperature above about 600° F. (315.6° C.) and pressure above about 500 p.s.i.g. (3.44 MPa) and recovering the product.

Still further embodiments comprise methods for preparing a catalyst for use in at least one petroleum hydrocarbon treating process, the method comprising impregnating a porous inorganic oxide support with an aqueous solution comprising at least one catalytic agent or catalytic agent precursor selected from the group consisting of compounds of Group 6, alternatively referred to as Group VIB, of the Periodic Table of the Elements, and at least one catalytic agent or catalytic agent precursor selected from the group consisting of compounds of Groups 8, 9 or 10, alternatively referred to as Group VIII, of the Periodic Table of the Elements, and optionally comprising a phosphorous-containing compound and at least one organic chelating compound, the Group VIB and Group VIIIB and phosphorus compounds being thermally decomposable or oxidizable in the presence of an oxygen-containing atmosphere to their corresponding oxides and thereafter drying and calcining the resulting impregnated support, the support having been prepared by: (A) mixing alumina-containing powder with water and optionally nitric acid to form a damp mix; (B) shaping the damp mix so as to form support particles suitable for use in a hydroprocessing reactor; and the support comprising a porous inorganic oxide having a total pore volume (TPV) of about 0.8 cc/g to about 1.5 cc/g and the following pore size distribution and pore content corresponding to values as measured using mercury porosimetry: (i) equal to or greater than 25% to 45% of TPV in pores having a diameter of 100 Å (10 nm) to 200 Å (20 nm); (ii) greater than 15% to less than 30% of TPV in pores having a diameter of 200 Å (20 nm) to less than 1000 Å (100 nm); and (iii) equal to or greater than 10% to less than 30% of the pore volume in pores having a diameter of 1000 Å (100 nm) to 30,000 Å (3,000 nm).

DETAILED DESCRIPTION

Definitions

Figure 1A:
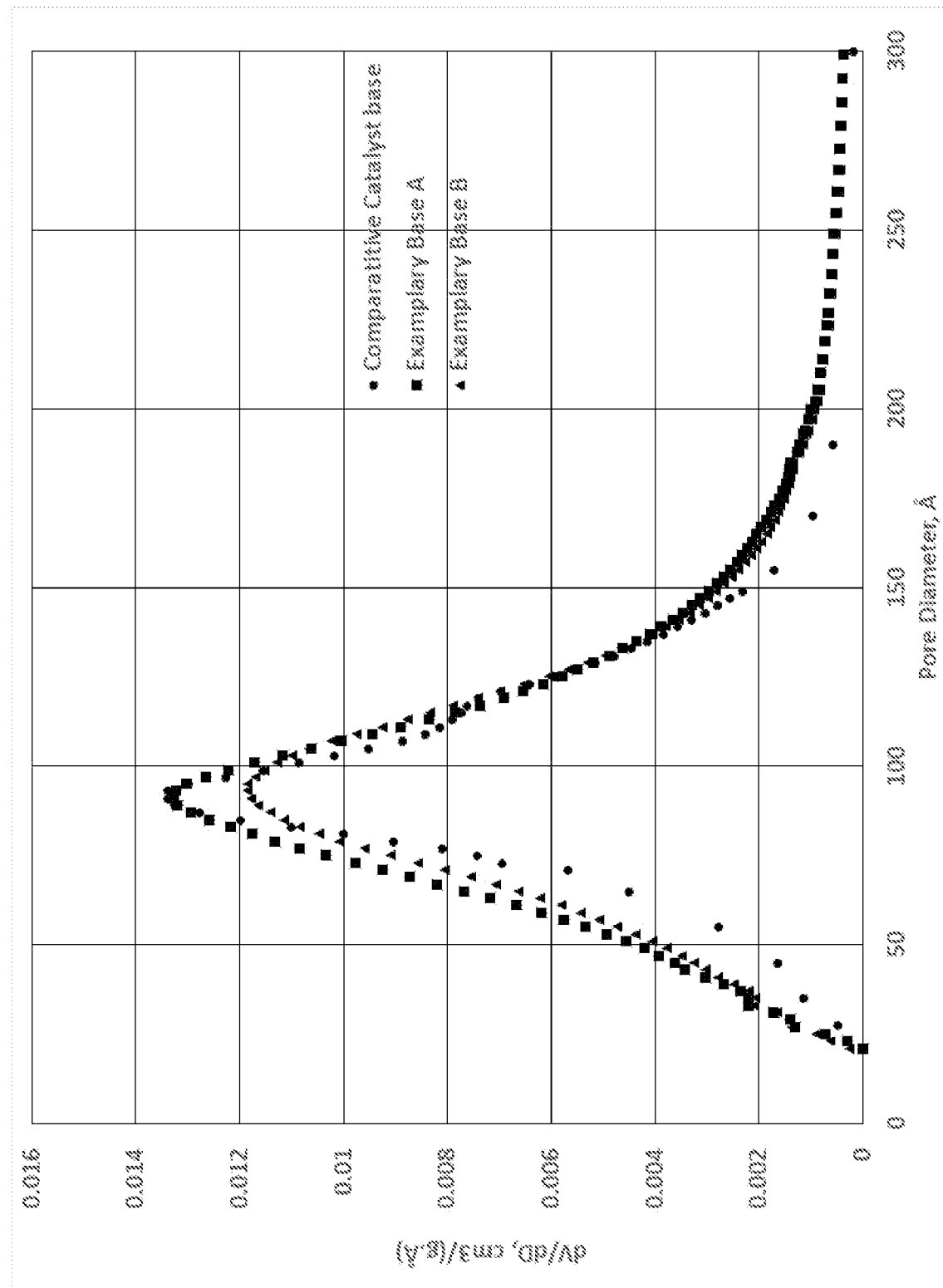
FIG. 1A illustrates typical pore size distributions measured using the nitrogen desorption method of comparative catalyst carrier or support particles and catalyst carrier or support particles prepared according to the present invention.

As used herein the following terms or phrases have the indicated meanings.

Use of the word "alumina" is a convenient shorthand reference intended to encompass any and all of the inorganic oxides, individually and in combination, further disclosed hereinbelow as being useful herein. Encompassed are the powder form of the inorganic oxides as well as their subsequent treatment to form supports for use in preparing supported catalysts.

The terms "catalysts" and "catalyst systems" are used interchangeably herein.

The term "about" when used as a modifier for, or in conjunction with, a variable, characteristic or condition is intended to convey that the numbers, ranges, characteristics and conditions disclosed herein are flexible and that practice of the present invention by those skilled in the art using temperatures, rates, times, concentrations, amounts, contents, properties such as size, including pore size, pore volume, surface area, etc., that are outside of the stated range or different from a single stated value, will achieve the desired result or results as described in the application, namely, preparation of porous catalyst carrier particles having defined characteristics and their use in preparing active catalysts and processes using such catalysts.

"Apparent conversion"=100 minus percentage of hydrocarbons boiling @ ≥700° F. (371.1° C.) based on SimDist (Simulated Distillation) test according to ASTM D2887 ("Standard Test Method for Boiling Range Distribution of Petroleum Fractions by Gas Chromatography") after hydroprocessing, including, for example, HDA, HCR, HDN and/or HDS.

"Component" as applied to, for example, metals of the catalyst impregnating solution or catalyst per se refers to any compound or complex, including a salt, oxide, sulfide, or any intermediate form between oxide and sulfide of the metal in question.

"Comprise" or "comprising": Throughout the entire specification, including the claims, the word "comprise" and variations of the word, such as "comprising" and "comprises," as well as "have," "having," "includes," "include" and "including," and variations thereof, means that the named steps, elements, components or materials to which it refers are essential, but other steps, elements, components or materials may be added and still form a construct within the scope of the claim or disclosure. When recited in describing the invention and in a claim, it means that the invention and what is claimed is considered to be what follows and potentially more. These terms, particularly when applied to claims, are inclusive or open-ended and do not exclude additional, unrecited elements, components or methods steps.

"Feedstocks" or petroleum feedstocks typically treated using processes that include catalysts of the present invention are often described in terms of being "heavy" or "light". The terms "light" and "heavy" with regard to petroleum fractions are used herein in their normal sense within the refining industry to refer respectively to relatively low and high boiling point ranges. Heavy Fuel Oils (HFOs) include both finished products (residual fuels) and the primary refinery streams from which they are blended. Members of the heavy fuel oil category are a diverse group of substances encompassing hydrocarbons with a wide range of molecular weights, carbon numbers (typically about $C_7$ to about $C_{50}$) and boiling points (about 250° F. to about 1112° F. (about 121° C. to 600° C.). In addition to petroleum hydrocarbons, feedstocks may contain one or more heterocyclic compounds containing sulfur, nitrogen, and oxygen, and organometallic or metallic compounds. Finished heavy fuels (residual fuels) are products that comprise primarily the residuum of the refining process after virtually all of the higher-quality hydrocarbons have been distilled, cracked, or catalytically removed from crude oil feedstock. Substantially all (at least 90 vol. %) of hydrocarbon feed streams or feedstocks typically fall within the boiling point range between about 300° F. and 1050° F. (between about 148.9° C. and 565.6° C.) and preferably between about 600° F. and 1000° F. (between about 315.6° C. and 537.8° C.). A feedstock can comprise a mixture of petroleum fractions such as atmospheric and vacuum gas oils (AGO and VGO). Suitable feedstocks include heavy hydrocarbonaceous mineral or synthetic oil or a mixture of one or more fractions thereof. Thus, such known feedstocks as straight run gas oils, vacuum gas oils, demetallized oils, deasphalted vacuum residue, coker distillates, catalytic cracker distillates, shale oil, tar sand oil, coal liquids, and the like are contemplated. A preferred feedstock will have a boiling point range starting at a temperature above about 260° C. (above about 500° F.). Hydrocracking feedstock may contain nitrogen, usually present as organonitrogen compounds in amounts between 1 ppm and 1.0 wt. %. The feedstock will normally also comprise sulfur-containing compounds sufficient to provide a sulfur content greater than 0.15 wt. %. The boiling point ranges of various product fractions recovered in any particular refinery will vary depending on such factors as the characteristics of the crude oil source, the refinery's local markets, product prices, etc. The American Petroleum Institute (API) has recommended to the Environmental Protection Agency (EPA) a list of generic names for refinery streams consistent with industry operations and covering all known processes used by refiners. The list, including generic names, Chemical Abstracts Service (CAS) numbers and definition of each stream, was published by the EPA as "Addendum I, Generic Terms Covering Petroleum Refinery Process Streams." The definitions for these streams can also be found "High Production Volume (HPV) Chemical Challenge Program, Test Plan, Heavy Fuel Oils Category", Submitted to the US EPA, The Petroleum HPV Testing Group (Jun. 17, 2004), Appendix A, pages 38-42. Petroleum streams suitable for processing using the catalysts of the present invention are identified in the EPA document, the content of which is incorporated herein by reference, to the extent permitted.

"Group" or "Groups": Any reference to a Group or Groups of the Periodic Table of the Elements is preferably to the Group or Groups as reflected in the Periodic Table of Elements using the IUPAC system for numbering groups of elements as Groups 1-18. However, to the extent that a Group is identified by a Roman numeral according, for example, to the Periodic Table of the Elements as published in "Hawley's Condensed Chemical Dictionary" (2001) (the "CAS" system) it will further identify one or more Element of that Group so as to avoid confusion and provide a cross-reference to the numerical IUPAC identifier.

"Median pore diameter" (MPD) can be calculated, for example, based on volume, surface area or based on pore size distribution data. Median pore diameter calculated by volume means the pore diameter above which half of the total pore volume exists; median pore diameter calculated by surface area means that pore diameter above which half of the total pore surface area exists. In addition, median pore diameter calculated based on pore size distribution means the pore diameter above which half of the pores have a larger diameter according to the pore size distribution determined as described elsewhere herein, for example, using the mercury intrusion method.

"Micropore" is typically understood to refer to pores that are present in supported catalysts or catalyst supports and having a diameter of less than 20 Å (2 nm).

"Mesopore" is typically understood to refer to pores present in supported catalysts or catalyst supports having a diameter of 20 A (2 nm) to less than 1000 Å (100 nm). However, within this broader range, are also mesopore "sub-ranges" important to the inventions disclosed herein and including the range of 100 A (10 nm) to 200 Å (20 nm) and 200 A (20 nm) to 1000 Å (100 nm).

"Macropore" is typically understood to refer to pores present in supported catalysts or catalyst supports having a diameter equal to or greater than 1000 Å (100 nm), such as 1000 Å (100 nm) to 30,000 Å (3,000 nm).

Each of the above definitions of micropore, mesopore, mesopore sub-ranges and macropore are distinct such that there is no overlap and pores are not counted twice when summing up percentages or values in a distribution of pore sizes for any given sample.

"d50" means, for purposes of the present invention, the median pore diameter as measured by mercury porosimetry. Thus, d50 corresponds to the median pore diameter calculated based on pore size distribution and is the pore diameter above which half of the pores have a larger diameter.

"Total pore volume" as used herein means the cumulative volume in cc/g of all pores discernable by either the nitrogen desorption method or mercury penetration, also referred to as mercury intrusion (porosimetry) method defined hereinbelow. For catalyst support or carrier particles, including alumina powder as well as alumina or silica-alumina powder or support particles, the pore diameter distribution and pore volume can be calculated with reference to nitrogen desorption isotherm (assuming cylindrical pores) by the B.E.T. (or BET) technique as described by S. Brunauer, P. Emmett, and E. Teller in the Journal of American Chemical Society, 60, pp 209-31.9 (1939); see also ASTM D 3037, which identifies the procedure for determining the surface area using the nitrogen BET method. It is generally accepted that the nitrogen desorption method is particularly useful with respect to smaller size pores whereas the mercury intrusion method is well suited for larger size pores. Unless otherwise stated, the mercury intrusion method is conveniently used to measure and express values and ranges over the full range of pore sizes present in the powders, carriers, catalyst supports or carriers and supported catalysts disclosed herein.

ASTM D4284-07, "A Standard Test Method for Determining Pore Volume Distribution of Catalysts by Mercury Intrusion Porosimetry" is an accepted test that is used to determine the volume distribution of pores in catalysts and catalyst carrier or support particles with respect to the apparent diameter or size of the entrances to pores. As discussed above, generally both the size and volume of pores in a catalyst affect its performance. Thus, the pore volume distribution is useful in understanding catalyst performance and may be one of the characteristics specified for a catalyst that can be expected to perform in a desired manner. Values for pore volume, including total pore volume or total intrusion volume, and various attributes of pore volume distribution, such as the percentage of pores in various size ranges are based on the mercury intrusion method, unless otherwise disclosed.

Pore diameter distribution using the mercury intrusion method can be calculated by means of the formula:

$$\text{pore diameter (in Angstroms)} = \frac{150,000}{\text{absolute mercury pressure (in bar)}}$$

and in accordance with the mercury penetration method (as described by H. L. Ritter and L. C. Drake in Industrial and Engineering Chemistry, Analytical Edition 17, 787 (1945)), using mercury pressures of 1-2000 bar and as defined in ASTM D4284-07. Mercury penetration is the technique of choice when the quantity of micropores is small, particularly when compared to the quantity of mesopores and macropores. However, the mercury penetration method is conveniently used and thus the quantity of all pores present in a support or supported catalyst can be, and is, also expressed based on the use of this method.

Total $N_2$ pore volume of a sample is the sum of the nitrogen pore volumes as determined by the above-described nitrogen desorption method. Similarly, the total mercury pore volume of a sample is the sum of the mercury pore volumes as determined by the mercury penetration method described above using, for example, a contact angle of 130°, a surface tension of 485 dynes/cm and a Hg density of 13.5335 gm/cc.

"Surface area" refers herein to the specific surface area determined by nitrogen adsorption using the BET technique as described above, whether in powder or agglomerate form.

All morphological properties involving weight, such as pore volume, PV (cc/g) or surface area, (SA) (m$^2$/g) can be normalized to a "metals free basis" in accordance with procedures well known in the art. However, the morphological properties reported herein are on an "as-measured" basis without correcting for metals content.

"Periodic Table": All references to the Periodic Table of the Elements herein refers to the Periodic Table of the Elements, published by the International Union of Pure and Applied Chemistry (IUPAC), published on-line at http://old.iupac.org/reports/periodic_table/; version dated 19 Feb. 2010.

As utilized herein with respect to numerical ranges, the terms "approximately," "about," "substantially," and similar terms will be understood by persons of ordinary skill in the art and will vary to some extent depending upon the context in which it is used. If there are uses of the terms that are not clear to persons of ordinary skill in the art, given the context in which it is used, the terms will be plus or minus 10% of the disclosed values. When "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims. Unless otherwise defined with respect to a specific property, characteristic or variable, the term "substantially" as applied to any criteria, such as a property, characteristic or variable, means to meet the stated criteria in such measure such that one skilled in the art would understand that the benefit to be achieved, or the condition or property value desired is met. For example, see below for use of the term "substantially" in connection with description of substantially isothermal.

When used with reference to various processes for treating hydrocarbon feedstocks, the phrase "substantially isothermal" is typically understood to mean operation of the process is such that temperature may typically vary throughout the catalyst bed by less than about 50° F., preferably less than about 40° F., more preferably less than about 30° F., for example less than about 20° F., such as close to 0° F. and up to about 20° F. or 30° F. or 40° F. or as much as 50° F. In the alternative, operation of such a process may be referred to as operating isothermally even while exhibiting a temperature variation as described above.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Embodiments of the present invention include methods for preparing catalyst carriers and supported catalysts using such carriers as well as use of the supported catalysts for hydroprocessing, hydrocracking (HCR), hydrodearomatization (HDA), hydrodesulfurization (HDS), hydrodenitrification (HDN), hydrodemetallation (HDM) and hydrodemicrocarbon residue (HDMCR) or microcarbon reduction activity. The supports or carriers disclosed herein are also useful for preparing other catalysts useful in various processes. More particularly, embodiments also relate to a method for the preparing a porous catalyst carrier or support and supported catalysts using such carrier having preferred and defined pore characteristics, including pore size and pore size distribution, and containing at least one metal and/or metal compound of Group 6 (also referred to as Group VIB) and Groups 8, 9 and 10 (also referred to as Group VIIIB) of the Periodic Table of the Elements, and optionally comprising phosphorus.

Illustrative carriers or supports are generally identified as inorganic oxide porous carriers; and such carriers will be generally understood to comprise many holes, perforations, and/or porosity. Examples of suitable porous carrier materials include silica, silica gel, silica-alumina, alumina, alumina with silica-alumina dispersed therein, alumina-coated silica, silica-coated alumina, titania, titania-alumina, zirconia, boria, terrana, kaolin, magnesium silicate, magnesium carbonate, magnesium oxide, aluminum oxide, precipitated aluminum oxide, activated alumina, bauxite, kieselguhr, pumice, natural clays, synthetic clays, cationic clays or anionic clays such as saponite, bentonite, kaolin, sepiolite or hydrotalcite, and mixtures thereof. Preferred porous carrier materials are silica, silica-alumina, alumina, titania, titania-alumina, zirconia, bentonite, boria, and mixtures thereof; silica, silica-alumina, alumina and mixtures thereof are especially preferred as is alumina containing up to about 20 wt % of silica, preferably up to about 12 wt % of silica, for example up to about 10 wt % silica.

Examples of silica-alumina compositions suitable for use in the present invention exhibit properties such as the following:

| Property | Typical Range |
|---|---|
| Chemical Composition, $Al_2O_3/SiO_2$ wt % | 85-98/15-2 |
| Surface Area by $N_2$ Adsorption, m$^2$/g | 250-550 |
| Pore Volume by $N_2$ Adsorption, mL/g | 0.98-1.63 |
| Diameter at 50% Pore Volume ($D_{50}$), nm | 11.0-13.0 |

Alumina for use as a carrier can be prepared, for example, by converting an alumina precursor in pseudoboehmite form, into a preferred form for use as a carrier material, including for example, gamma-alumina, typically using calcination.

Alumina-Containing Powder Preparation

As disclosed hereinabove, the following disclosures specifically referring to alumina-containing compositions also applies, with appropriate adjustments well-known to those skilled in the art, to the other inorganic oxides identified as useful herein, and specifically to silica-alumina, and to their combinations.

In carrying out embodiments of the present invention, alumina-containing compositions are typically prepared in a batch process in which alumina and/or an alumina-containing composition is precipitated under controlled reactant concentrations and reaction conditions, including temperature, time, pH, reactant feed rates and the like. Such processes are generally known in the art (see, for example, U.S. Pat. No. 4,154,812, Sanchez et al., U.S. Pat. No. 6,403,526, Lussier et al., and the patents cited therein, the disclosures of which are incorporated herein by reference); relevant alumina preparative methods are disclosed herein. Preparation of silica-alumina compositions are specifically disclosed in Lussier et al. (the disclosure of which is incorporated herein by reference to the extent permitted).

In a preferred embodiment for preparing alumina or silica-alumina, filter cake produced in the course of the synthesis is dried to produce a powder that can be conveniently stored without degrading for long periods of time prior to use in further processing. Drying of the filter cake may be done by several methods, such as tray drying, belt drying, spray drying, combinations of these and the like. Drying conditions are typically adjusted to effect the partial removal of water, for example to a level of about 20 wt. % to about 35 wt. % volatiles, preferably about 22 wt. % to about 30 wt. %, for example, about 23, 24, 25, 26, 27, 28, or 29 wt. % volatiles.

Dried alumina and/or silica-alumina powder and water are mixed or commingled to provide what is referred to as a damp or wet mix or a dough. Optionally, an acidic or basic aqueous medium, such as an aqueous solution of an acid or acid salt, can also be added to the mixture. When an acid is included, preferably an aqueous solution of a monobasic mineral acid is commingled with water and the alumina to provide the mix. Hydrochloric acid and other strong monobasic acids, including nitric acid may be used; nitric acid is preferred. Other useful acids include organic acids such as acetic acid, formic acid, propionic acid and the like. Alternatively, an aqueous base such as ammonium hydroxide can be used. In addition, as disclosed in the art, recycled, calcined product fines in an amount of up to about 25 percent by weight of total alumina may advantageously be added during this step.

The mixture resulting from the previous step is referred to as a damp mix. This mix is formed into the carrier, such as in the form of pills or other shapes, as described elsewhere herein. This step is conveniently conducted by extruding the damp mix, which is typically followed by drying and calcination of the pills.

Calcination may be done batchwise or continuously by contacting the shaped alumina carrier product with hot gases which may be either indirectly heated gases or the combustion products of ordinary fuels with air. Regardless of the particular method used, the product is typically preheated for a limited period of time at a temperature less than the target calcining temperature followed by calcining at temperatures of about 1000° F. (537.8° C.) to about 2000° F. (1093.3° C.), alternatively at about 1200° F. (648.9° C.) to about 1900° F. (1037.8° C.), such as about 1400° F. (760° C.) to about 1800° F. (982.2° C.), for periods of from about 30 minutes to about 3 hours, preferably about 30 minutes to about 2 hours. Alternatively, pills can be heated and calcined in order to achieve a desired target level of Loss on Ignition as described elsewhere herein.

Silica-Alumina Support Properties

As described above, the powder is subsequently mixed with water and optionally with recycled fines (catalyst powders and/or catalyst support powders) and an acid such as nitric acid and extruded to produce support particles such as in the form of pills, which are then dried and preferably calcined. Recycled fines typically comprise the inorganic oxide per se or ground catalyst or its corresponding support or carrier and typically exhibit a particle size in the range of 10 to 100 micrometers. In the description that follows, the product produced at this stage of the process is referred to as "alumina support particles", catalyst support particles or "catalyst carrier particles" or simply "support" or "carrier" particles.

Support particles are typically subjected to a thermal treatment or calcination at a temperature, in ° C., in the range of typically from about 450 to about 1100, preferably from about 550 to about 1000, and most preferably from about 600 to about 900° C. for periods of time in hours of typically from about 0.2 to about 3, preferably from about 0.3 to about 2, and most preferably from about 0.5 to about 1.5 hours. The atmosphere in which activation is conducted is typically air, but can include inert gases such as nitrogen or be conducted exclusively in an inert atmosphere.

Several properties of the alumina support particles produced according to the synthesis methods described above are typically determined and generally characterize the particles. Various properties and test methods are defined hereinabove and also referred to in the Examples below. Typical values for several of the properties are summarized as follows.

The total mercury pore volume of a sample is the sum of the mercury pore volumes as determined by the mercury penetration method described above.

Support or carrier particles of the present invention have a total pore volume (TPV) prior to incorporation of catalytic metals and other catalyst components, also sometimes referred to a total intrusion volume, TIV, or total mercury pore volume, which refers to measurements made using the mercury intrusion method) in cc/g, of typically about 0.8 to about 1.5 cc/g; alternatively about 0.85 or about 0.9 or about 0.95 or about 1.0 or about 1.05 or about 1.10 or about 1.15 cc/g; to about 1.45 or about 1.40 or about 1.35 or about 1.30 or about 1.25 or about 1.20 cc/g.

On the other hand, the "as-measured" total pore volume of supported catalysts according to the present invention and comprising the catalytic metals and other catalytic components, such as chelating agents or chelating agent residues following drying and/or calcining, is typically significantly lower, for example about one-half of the values recited above for the support per se. Measured TPV values for supported catalysts of the Examples herein were about 0.45 cc/g, due in part to the high content of catalytic metals.

Silica-alumina support or carrier particles produced in accordance with the present invention have a total surface area in $m^2/g$ determined by nitrogen adsorption using the BET technique, of at least about 185, or at least about 195 or at least about 205 $m^2/g$, and with respect to each recited value up to a total nitrogen surface area of about 425 $m^2/g$, or about 400 $m^2/g$, or about 375 $m^2/g$, or about 350 $m^2/g$, or about 325 $m^2/g$, or about 300 $m^2/g$, or about 275 $m^2/g$.

The content of pore sizes equal to or greater than 1000 Å and up to and including 30,000 Å (3,000 nm), measured using the mercury penetration method, will be typically equal to or greater than 10% to less than or equal to 30% of the total pore volume; for example, equal to or greater than 12%, or 14%, or 16%, or 18%, or 20%, or 22%, or 24%, or 26%; and less than or equal to 29%, or 28%, or 27%, or 26%, or 25%, or 24%, or 23%, or 22%, or 21%, or 20%. Furthermore, for each of the ranges resulting from the recited lower and upper values, amounts "greater than" and "less than" include values expressed in tenths of a percent as well as unit percentage values.

The content of pores in carrier particles useful in the present invention, namely pores having diameters of 200 Å (20 nm) or more to less than 1000 Å (100 nm) measured using the mercury penetration method, typically range from equal to or greater than about 15% to equal to or less than about 30% of the total pore volume; for example, equal to or greater than 16%, or 17%, or 18%, or 19%, or 20%, or 21%, or 22%, or 23%; and less than or equal to 29%, or 28%, or 27%, or 26%, or 25%, or 24%, or 23%, or 22%, or 21%, or 20%. Furthermore, for each of the ranges resulting from the recited lower and upper values, amounts "greater than" and "less than" include values expressed in tenths of a percent.

The pore content of the carrier particles measured using the mercury penetration method, namely carrier particles exhibiting pores having diameters of less than 200 Å (20 nm), will be typically greater than about 55% to about 75%; or greater than 57%, or 59%, or 61%, or 63%, or 65%, or 67%, or 69%; and less than or equal to about 74%, or 73%, or 72%, or 71%, or 70%, or 69%, or 68%, or 67%, or 65%. Furthermore, for each of the ranges resulting from the recited lower and upper values, amounts "greater than" and "less than" (or "to") include values expressed in tenths of a percent as well as unit percentage values.

Carrier particles suitable for use in the present invention can also contain pores within a size range of pores exhibiting pore sizes from about 100 Å (10 nm) to about 200 Å (20 nm) are also measured and reported using the mercury penetration method, described hereinabove. The content of pores within the range of from about 100 Å (10 nm) to about 200 Å (20 nm) will be typically equal to or greater than about 25% to about 45%; or greater than 26%, or 27%, or 28%, or 29%, or 30%, or 31%, or 32%, or 33% or 34%, or 35%, or 36%, or 37%, or 38%, or 39%, or 40%; and less than or equal to about 44%, or 43%, or 42%, or 41%, or 40%, or 39%, or 38%. Furthermore, for each of the ranges resulting from the recited lower and upper values, amounts "greater than" and "less than" (or "to") include values expressed in tenths of a percent as well as unit percentage values.

Typically, catalyst carrier or support particles prepared according to the present invention exhibit a pore size distribution (PSD) with a major or significant peak located at a lower pore diameter as observed on a pore size distribution plot, wherein differential mercury intrusion volume is plotted as a function of the log differential of the pore diameter (dV/dlogD), according to the porosimetry method, ASTM D4284-07. For purposes of the present invention particles comprising a carrier or support, as well as supported catalysts prepared using the supports, may also exhibit one or more additional peaks at greater than the peak located at lower pore diameters noted above. Pore size distribution plots comprising peaks at such lower diameters are illustrated in FIGS. 1 and 2.

Figure 1B:
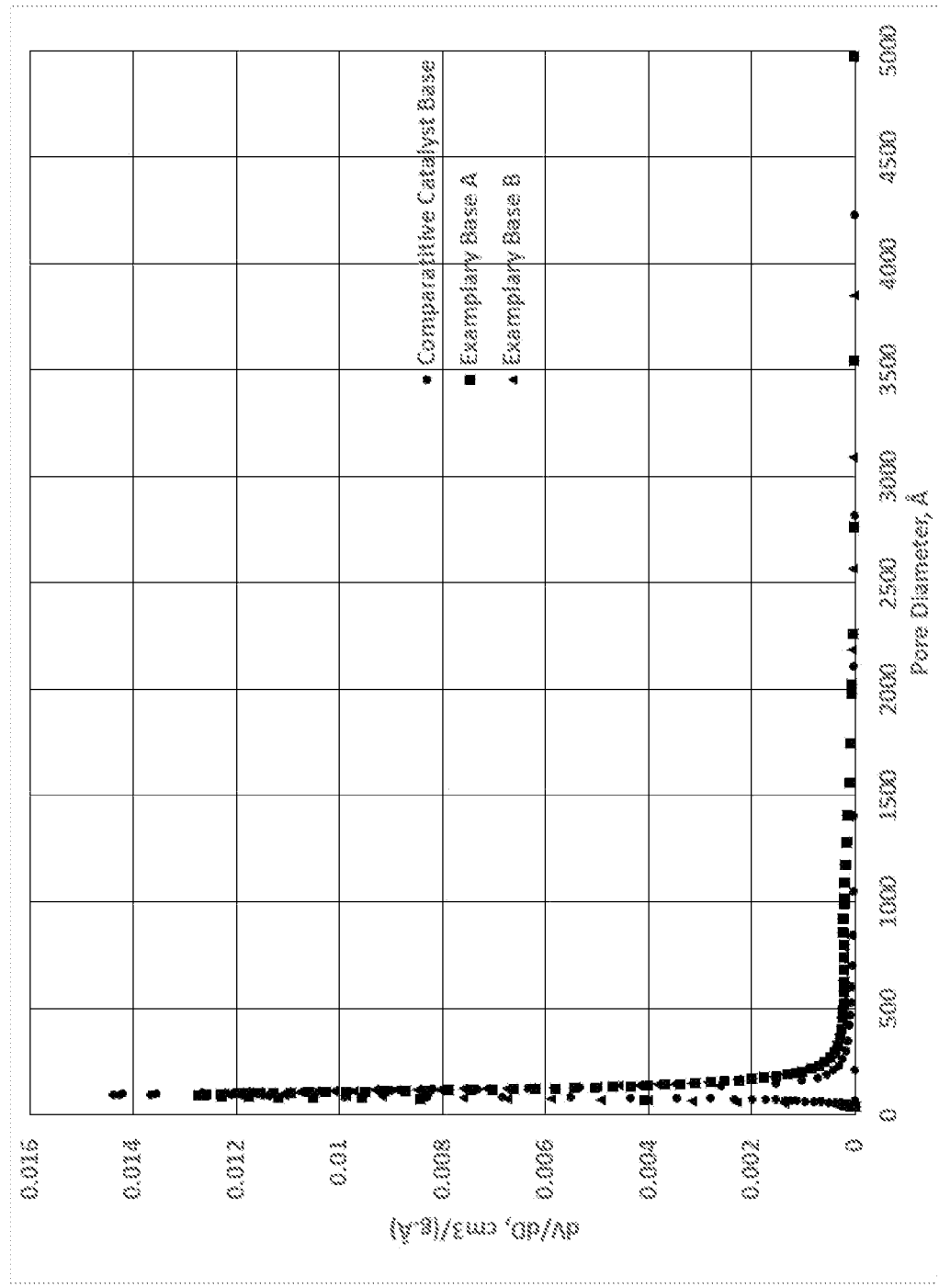
FIG. 1B illustrates typical pore size distributions measured using the mercury intrusion method of comparative catalyst carrier or support particles and catalyst carrier or support particles prepared according to the present invention.
Figure 1C:
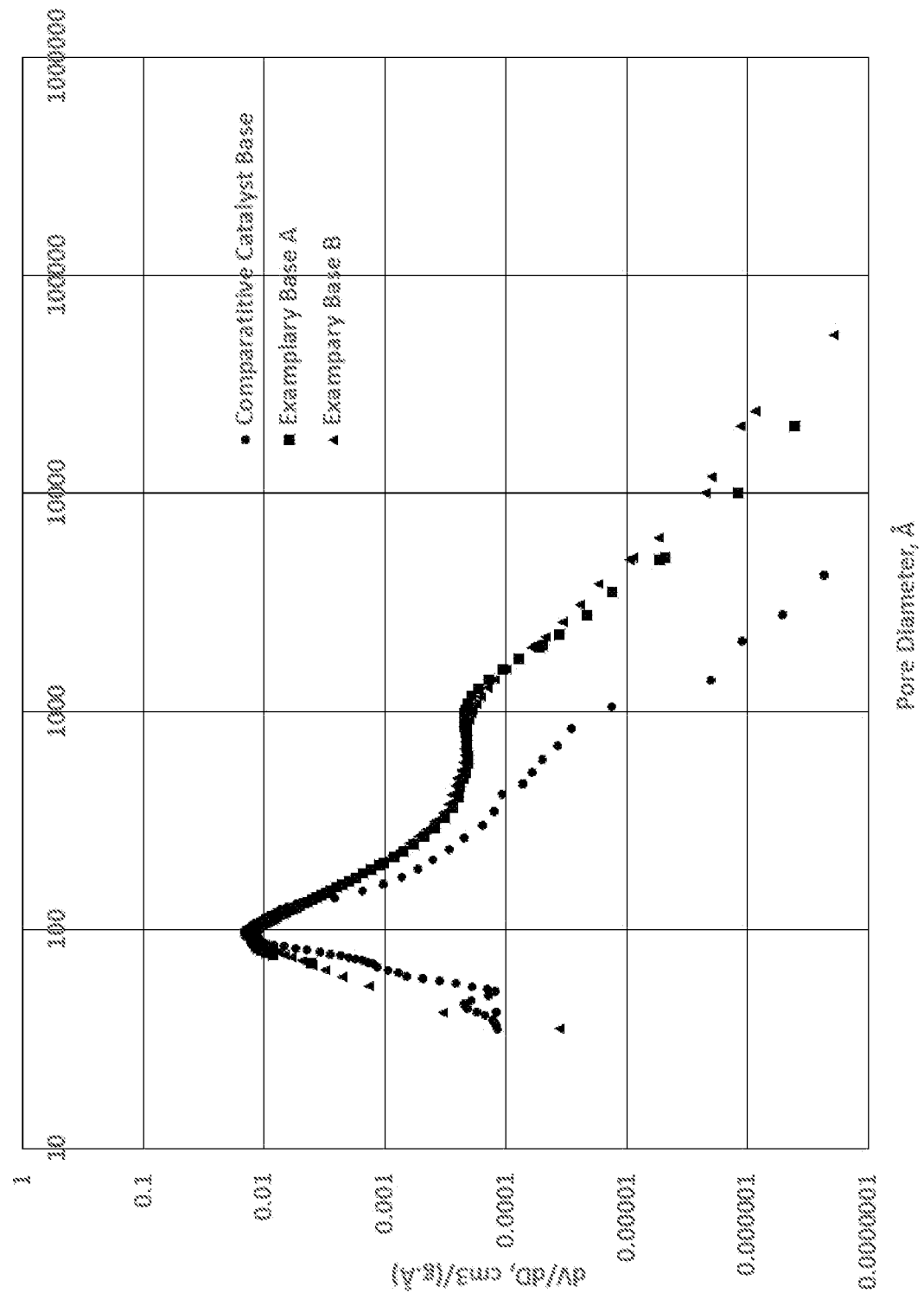
FIG. 1C illustrates typical pore size distributions on a logarithmic scale measured using the mercury intrusion method of comparative catalyst carrier or support particles and catalyst carrier or support particles prepared according to the present invention.

The carrier or support particles are further characterized in that they exhibit a d50 (also measured using the mercury penetration method) typically greater than about 110 Å (11 nm) and less than about 170 Å (17 nm), or greater than about 120 Å (12 nm) and less than about 160 Å (16 nm), such as greater than about 125 Å (12.5 nm) and less than about 135 Å (13.5 nm). On the other hand, supported catalysts of the invention are further characterized in that they exhibit a d50 (also measured using the mercury penetration method) typically greater than about 125 Å (12.5 nm) and less than about 210 Å (21 nm), or greater than about 130 Å (13 nm) and less than about 200 Å (20 nm), such as greater than about 135 Å (13.5 nm) and less than about 200 Å (20.5 nm). Referring to FIGS. 1A-1C, it will be observed that initial peaks appear at about 80 Å (8 nm) when measured using nitrogen and at about 90 Å to 100 Å (9 to 10 nm) when measured using the mercury penetration method.

Figure 2A:
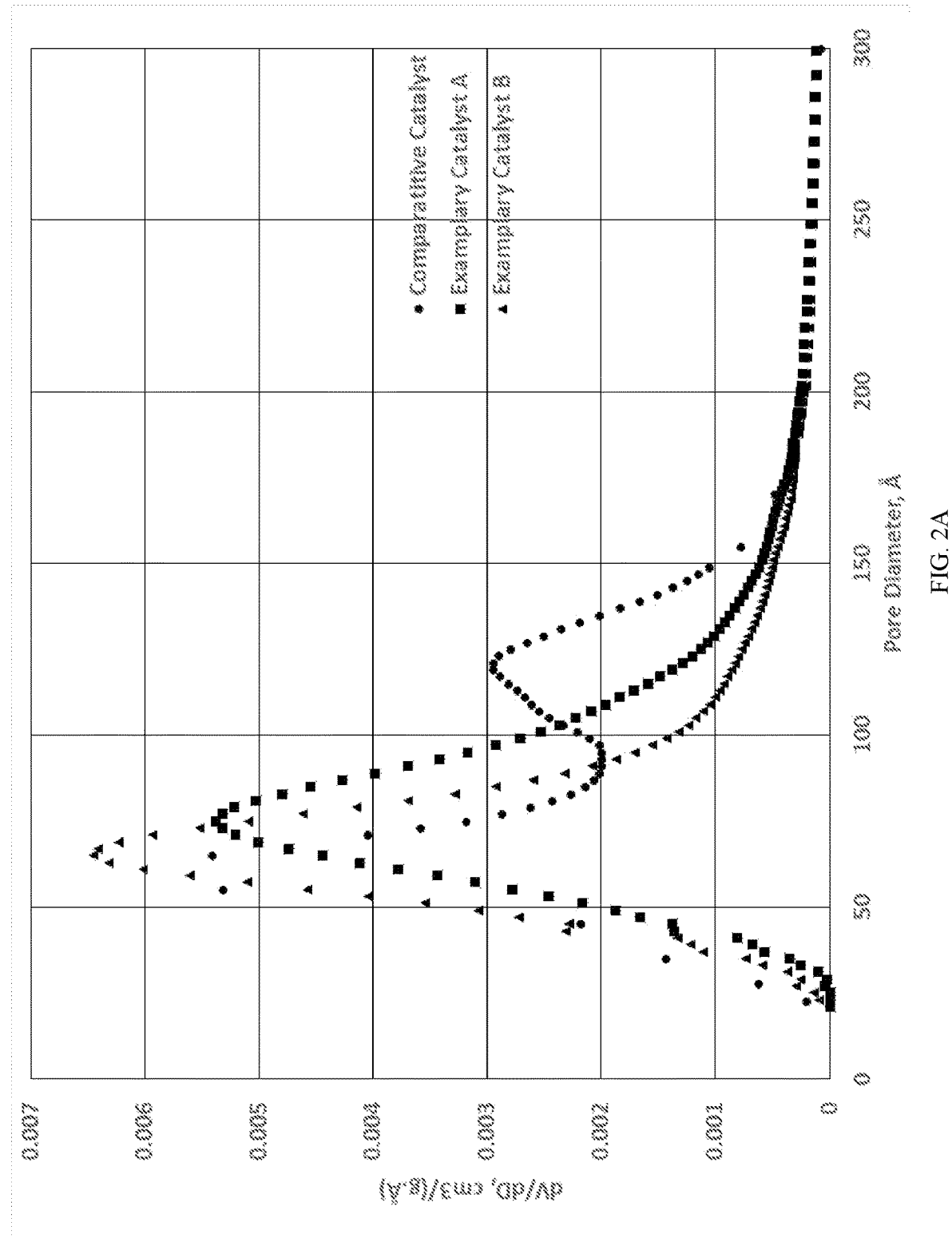
FIG. 2A illustrates typical pore size distributions measured using the nitrogen desorption method of supported catalysts, with and without added fines and prepared according to the present invention.
Figure 2B:
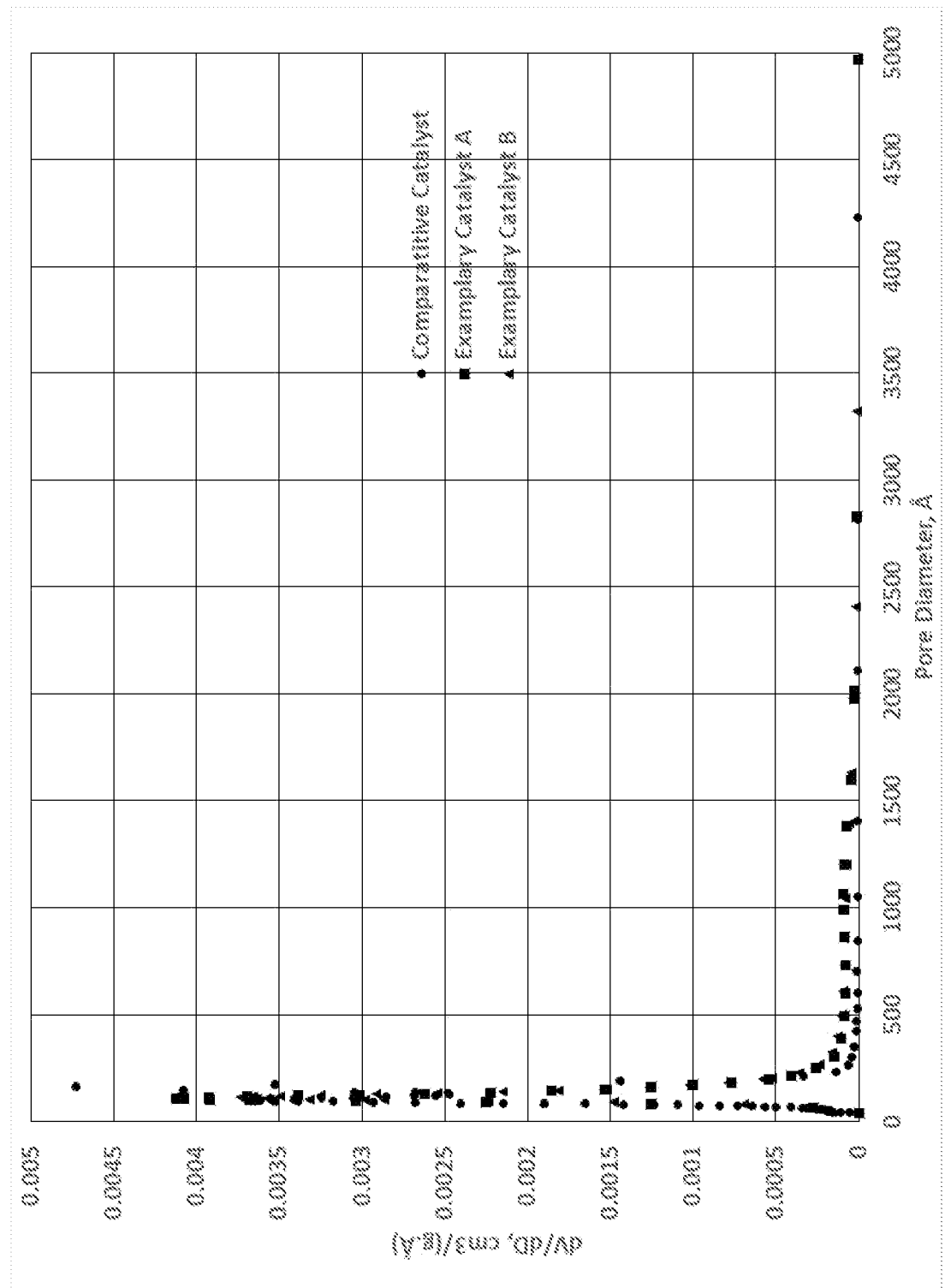
FIG. 2B illustrates typical pore size distributions measured using the mercury intrusion method of supported catalysts, with and without added fines and prepared according to the present invention.
Figure 2C:
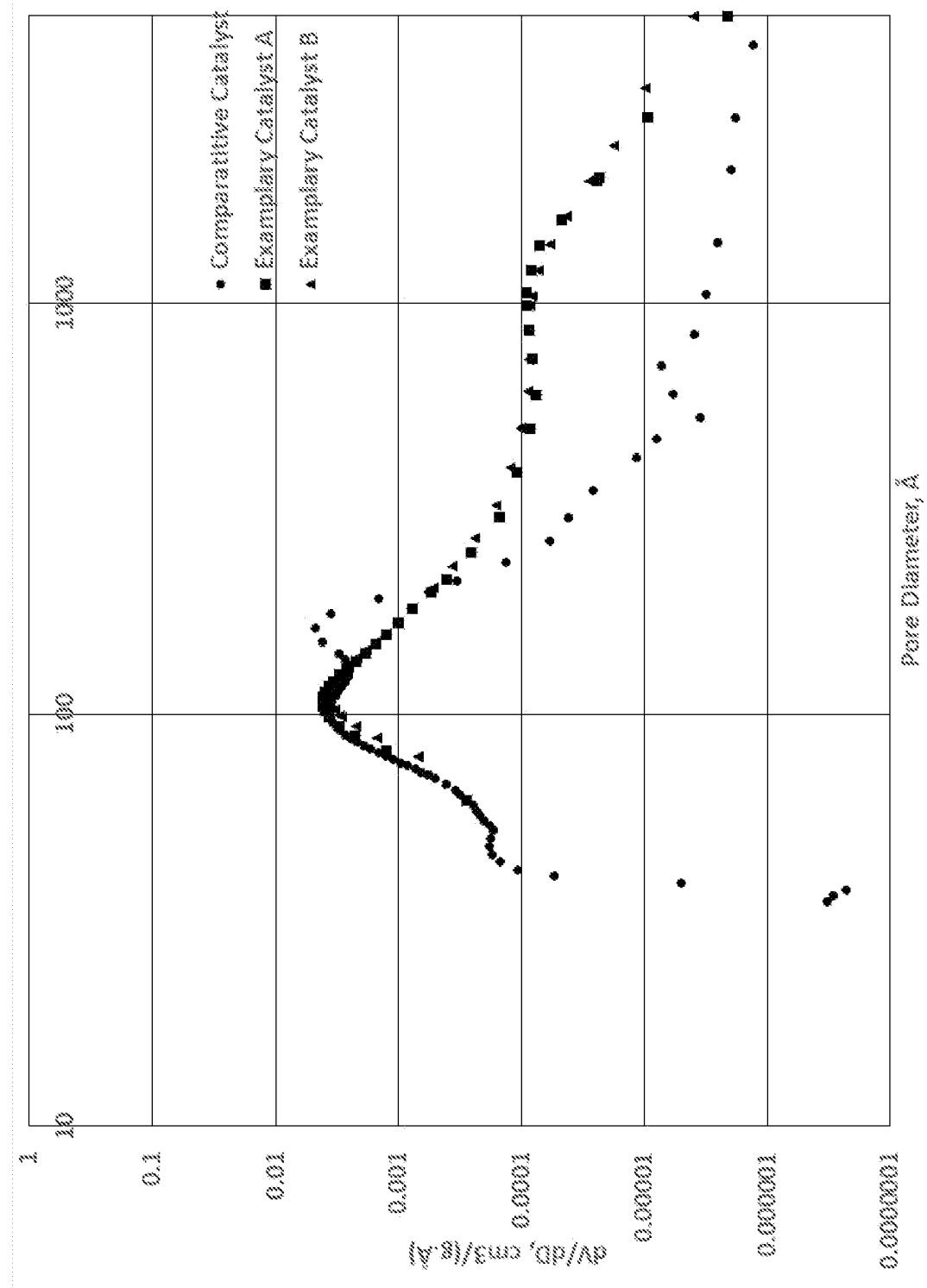
FIG. 2C illustrates typical pore size distributions on a logarithmic scale measured using the mercury intrusion method of supported catalysts, with and without added fines and prepared according to the present invention.

Typical pore size distributions of supported catalysts, with and without added fines and prepared according to the present invention are illustrated in FIG. 2A-C. It will be observed that the initial peaks, located at lower pore diameters, are between 50 Å (5 nm) and 100 Å (10 nm), estimated from FIGS. 2A and 2C at about 65 Å (6.5 nm) and 75 Å (7.5 nm) based on nitrogen measurements and at about 110 Å (11.0 nm) based on the mercury intrusion method.

Supported catalysts prepared according to the invention disclosed herein exhibit distributions of pore sizes measured using the mercury porosimetry method also disclosed herein, including the following characteristics:

(A) equal to or greater than about 50% and up to about 75% of TPV, or equal to or greater than 51%, or equal to or greater than 52%, or equal to or greater than 53%, or equal to or greater than 54%, or equal to or greater than 55%, or equal to or greater than 56%, or equal to or greater than 57%, or equal to or greater than 58%, or equal to or greater than 59%, or equal to or greater than 60%, or equal to or greater than 62%, or equal to or greater than 64%; and up to about 73%, or about 71% or about 69%, or about 67%, or about 65%, or about 63%; in pores having a diameter of less than 200 Angstroms (Å) (20 nm);

(B) pores within a size range of pores exhibiting pore sizes from about 100 Å (10 nm) to about 200 Å (20 nm), similarly measured and reported using the mercury penetration method, and exhibiting a content of pores typically about 35% to about 60%; or greater than 36%, or 37%, or 38%, or 39%, or 40%, or 41%, or 42%, or 43% or 44%, or 45% or 46%, or 47%, or 48%, or 49%, or 50%, or 51%, or 52%; and less than or equal to about 59%, or 58%, or 57%, or 56%, or 55%, or 54%, or 53%, or 52%, or 51%, or 50%. Furthermore, for each of the ranges resulting from the recited lower and upper values, amounts "greater than" and "less than" include values expressed in tenths of a percent as well as unit percentage values.

(C) pores within the size range of pores generally identified as exhibiting pore sizes from greater than 0 Å (0 nm) or greater than 20 Å (2 nm) to about 100 Å (10 nm), and also measured and reported using the mercury penetration method, exhibit a content of pores typically greater than about 4% to about 14%; or greater than 5%, or 6%, or 7%, or 8%, or 9%, or 10%; and less than or equal to about 13%, or 12%, or 11%, or 10%. Furthermore, for each of the ranges resulting from the recited lower and upper values, amounts "greater than" and "less than" include values expressed in tenths of a percent as well as unit percentage values.

(D) greater than about 15% and up to less than about 30% of TPV, or greater than about 17%, or greater than about 20%, or greater than about 22%; and up to less than about 28%, or less than about 25%, or less than about 23%; in pores having a diameter of 200 Å (20 nm) to less than 1000 Å (100 nm);

(E) equal to or greater than 10% up to less than 30% of TPV, or equal to or greater than 12%, or equal to or greater than 15%, or equal to or greater than 17%, or equal to or greater than 20%; up to less than 28%, or up to less than 25%, or up to less than 23%; in pores having a diameter of 1000 Å (100 nm) to 30,000 Å (3,000 nm); and Catalyst Preparation Generally, hydroprocessing catalysts can be produced using alternative methods. In an impregnation method (note that pre- and post-impregnation methods are further described below), alumina-containing powder such as silica-alumina, is mixed with water and then extruded to form a pelleted catalyst support. The support is dried and calcined, and a Group 6 (for example, Mo) metal compound or precursor and Group 8, 9, or 10 (for example, Ni) metal compound or precursor are impregnated onto the support. The impregnated wet pellets are then dried and calcined to provide supported catalysts. In another preparation method, alumina-containing powder, such as silica-alumina, and catalytic metal precursors, water, and additives such as extrusion aids, peptizing chemicals, and the like, are combined, mixed, and extruded into pellets. The metal-containing wet pellets are then dried and calcined to produce the supported catalyst.

Suitable catalysts can be prepared by impregnating a catalyst carrier, preferably an alumina-containing carrier, such as silica-alumina, exhibiting the properties described herein, using stabilized aqueous compositions and methods as described in U.S. Pat. Nos. 7,390,766, 7,560,407 and 7,642,212 (D. P. Klein, assigned to Advanced Refining Technologies), the disclosure of which is incorporated herein to the extent permitted. A suitable method and composition comprises adding to a suitable quantity of water: (A) at least one substantially water insoluble Group 8, 9 or 10 metal component; and (B) at least one substantially water-soluble, phosphorous-containing acidic component in an amount insufficient to cause dissolution of the at least one Group 8, 9 or 10 metal component, so as to produce a slurry typically at ambient temperature, and combining the slurry with: (C) at least one Group 6 metal component; and (D) mixing the combination of (A), (B) and (C) and heating the mixture, for a time and to a temperature sufficient for (A), (B) and (C) to form a solution; and (E) adding an additional amount of water, if required, to obtain solution concentrations of at least one Group 8, 9 or 10 metal, the at least one Group 6 metal and phosphorous useful for impregnating the carriers; wherein Group 6 and Group 8, 9 and 10 refer to Groups of the periodic table of the elements. In various preferred embodiments: the molar ratio of the at least one Group 8, 9 or 10 metal to Group 6 metal is about 0.05 to about 0.45, provided that the amount of the at least one Group 8, 9 or 10 metal is sufficient to promote the catalytic effect of the Group 6 metal; the concentration of the Group 6 metal, expressed as the oxide, is at least about 3 to about 50 weight percent based on the weight of the composition; and the amount of phosphorous-containing acidic component is sufficient to provide a phosphorous to Group 6 metal molar ratio of about 0.05 to less than about 0.25. In a still further embodiment, the process includes the step of separating the volatile portion of the solution from the impregnated uncalcined carrier to obtain a dried catalyst having a desired moisture content.

"Pre-impregnated" catalyst refers to a catalyst in which the metals-containing solution or solutions are added before the porous catalyst carrier is calcined. The metals-containing solution or solutions can be added prior to or after shaping of the catalyst particle, but the important aspect is that the metals-containing solution or solutions be added prior to the carrier material being calcined. However, there are significant advantages to be gained by shaping of the uncalcined carrier after impregnation (contact) with an aqueous solution containing one or more catalytic metals. These advantages are observed in the form of more desirable distribution of the metals throughout the carrier in the final catalyst. Thus, a "pre-impregnated" catalyst can be made as follows:

Uncalcined alumina-containing, silica-alumina powder is thoroughly mixed with water, or optionally with a dilute aqueous solution of nitric acid, and the mixture is combined with a suitable quantity of a stable metals solution. Such solution typically contains at least one Group 6 and at least one Group 8, 9 or 10 metal compound or precursor, and optionally, but preferably phosphorus, such as molybdenum, nickel and phosphorus compounds, plus an optional additional quantity of metals solution of one or more metals of Group 8, 9 and 10, if required in order to provide the desired amount of metals on the finished catalyst. Note that the one or more metals of Group 8, 9 or 10, employed to achieve the optional additional quantity of the one or more metals of Group 8, 9 or 10, is typically selected to be water-soluble under the temperature conditions encountered. Additionally, as described elsewhere herein, a chelating agent or compound can optionally, but preferably, be included in the impregnating solution.

The metal-containing mixture, typically containing about 50 to about 65 weight percent moisture, is shaped into catalyst particles having a desired size, preferably by extrusion. The formed catalyst particles are dried using alternative or combination heating methods, including elevated temperature drying and a combination of elevated temperature and moderate calcining temperatures. For example, the wet, impregnated catalyst particles can be subjected to elevated temperature drying conditions of about 375° F. (190.6° C.) to about 425° F. (218.3° C.), for example 400° F. (204.4° C.) for a period of time of from about 30 to 60 minutes, for example 40 minutes, or overall to achieve a desired target LOI level as disclosed elsewhere herein. Alternatively, the wet, impregnated catalyst particles can be subject to an initial elevated drying temperature of about 300° F. (148.9° C.) to about 340° F. (171.1° C.), for example 320° F. (160° C.) for a limited period of time, such as for about 8 to 12 minutes, for example 10 minutes and then ramp the temperature to a moderate calcining temperature of about 650° F. (343.3° C.) to about 690° F. (365.6° C.), for example 670° F. (354.4° C.) over a period of about 30 to about 60 minutes, for example 40 minutes, and then hold the catalyst particles at the final ramp temperature for a period of time of about 8 to 12 minutes, for example about 10 minutes, or overall to achieve a desired target LOI level as disclosed elsewhere herein. Whichever drying method is used, due consideration is given to whether or not a chelating agent has been included in the impregnating solution and, if one or more has been used, to select overall drying conditions so as to preserve at least a portion of the chelating agent or its complex with the catalytic metals. Analytical methods known to those skilled in the art are available in order to determine the residual level of chelating agent, complex or thermal by-product in the dried, supported catalyst.

"Post-impregnated" catalyst refers to a catalyst in which the metals-containing solution or solutions are added after the porous catalyst carrier is calcined. Suitable calcining conditions for the carrier per se are described hereinabove. The porous catalyst carrier can be calcined before or after shaping of the catalyst carrier particle, but the important aspect of post-impregnation is that the metals-containing solution or solutions be added after the carrier material is calcined. Thus, a "post-impregnated" catalyst can be made as follows:

Uncalcined alumina-containing or silica-alumina powder is thoroughly mixed with water, or optionally with a dilute aqueous solution of nitric acid, and the alumina mixture, containing about 50 to 75 weight percent moisture, is then formed into catalyst particles having a desired size and shape, preferably by extrusion. The formed particles are dried at a temperature of about 110 to about 150° C., and then calcined at a temperature of about 400 to about 750° C. for about one to two hours. The dried and calcined particles are contacted with a suitable quantity of a stable metals solution. For example, such solution typically contains molybdenum, nickel and phosphorus, plus an optional additional quantity of solution of one or more metals of Groups 8, 9 or 10 (also identified as Group VIIIB according to the CAS designation), if required, in order to provide the desired amount of metals on the finished catalyst, while substantially and uniformly filling the pores. After a suitable contact time, the formed catalyst particles are dried according to one of the alternative conditions described immediately above.

It will be observed that a significant distinction between a pre-impregnated catalyst and a post-impregnated catalyst is that the post-impregnated catalyst undergoes two calcining steps; typically one consisting essentially of calcining the porous carrier and the second after which the calcined carrier has been impregnated with the catalytically active metal components and optionally with a phosphorous component. In contrast, the pre-impregnated catalyst undergoes one calcining step, as described.

Suitable catalytically active metals from Groups 8, 9 and 10 present in components of the invention may include suitable compounds of Fe, Co, Ni, Pd, Pt and the like and mixtures thereof. Of these, the most preferable are Co and Ni. Suitable Group VIB elements or metals include Cr, Mo, W, and mixtures thereof; most preferred are Mo and W. Preferred combinations of metal components comprise e.g., nickel and molybdenum, cobalt and molybdenum, tungsten and nickel or cobalt, molybdenum and a combination of cobalt and nickel, tungsten and a combination of nickel and cobalt, a combination of molybdenum and chromium and nickel, etc.; the combination of molybdenum and nickel is particularly preferred.

A suitable overall process for preparing a stable impregnating solution can be described as follows:

Basic nickel- and molybdenum-containing solutions can be prepared by combining water, a molybdenum source, a nickel source and aqueous ammonia in appropriate ratios. A variety of molybdenum and nickel sources may be used. For molybdenum, these include but are not limited to: molybdenum trioxide, ammonium dimolybdate, and ammonium heptamolybdate. For nickel, these include but are not limited to nickel carbonate and nickel nitrate. The component weights can be varied to ensure solution stability, as well as the proper concentration and ratio of metals. Component weights, order of addition, temperature, and reaction times required are well known to those skilled in the art.

Optionally, but preferably, the impregnating solution contains at least one chelating agent such as an organic compound known to effect chelation in combination with one or more of the catalytically active metal components. Suitable compounds or chelating agents include organic additives such as (i) an organic compound selected from the group consisting of compounds comprising at least two oxygen atoms and 2-10 carbon atoms and the compounds built up or derived from these compounds, or (ii) an organic compound comprising at least one covalently bonded nitrogen atom and at least one carbonyl moiety, or both (i) and (ii). The organic compound according to (i) above preferably is selected from the group of compounds comprising at least two oxygen-containing moieties, such as a carboxyl, carbonyl or hydroxyl moiety, and 2-10 carbon atoms, and the compounds built up or derived from these compounds. Compounds built up or derived from the organic compounds may be, for example, the ether, ester, acetal, acid chloride, acid amide, oligomer, or polymer of the organic compound. Examples of suitable organic compounds include carboxylic acids such as citric acid, tartaric acid, oxalic acid, malonic acid, maleic acid and malic acid; and butanediol, pyruvic aldehyde, glycol aldehyde, and acetaldol. Organic compounds selected from the group of compounds comprising at least two hydroxyl groups and 2-10 carbon atoms per molecule and the compounds built up from these compounds are even more preferred. Suitable compounds include, e.g., tartaric acid, or aliphatic alcohols such as ethylene glycol, propylene glycol, glycerin, trimethylol ethane, trimethylol propane, etc. Compounds built up from these organic compounds include oligo- and polymers, e.g., diethylene glycol, dipropylene glycol, trimethylene glycol, triethylene glycol, tributylene glycol, tetraethylene glycol, and tetrapentylene glycol. This range can be extrapolated to include, e.g., polyethers like polyethylene glycol. Regarding polyethylene glycol, polyethylene glycol having a molecular weight between 200 and 8,000 is preferred. Other compounds built up from these organic compounds are, e.g., ethers such as ethylene glycol monobutyl ether, diethylene glycol monomethyl ether, diethylene glycol monoethyl ether, diethylene glycol monopropyl ether, and diethylene glycol monobutyl ether. Preferred organic compounds are, inter alia, ethylene glycol, diethylene glycol, polyethylene glycol, or mixtures thereof. Another group of organic compounds comprising at least two hydroxyl groups and 2-10 carbon atoms per molecule is formed by, e.g., monosaccharides such as glucose and fructose. Compounds built up from these organic compounds include oligomers and polymers, e.g., disaccharides such as lactose, maltose, and saccharose and polysaccharides. A particularly preferred organic compound or chelating agent is citric acid.

Organic compounds according to (ii) preferably comprise at least two carbonyl moieties. It is preferred that at least one carbonyl moiety is present in a carboxyl group. It is furthermore preferred that at least one nitrogen atom is covalently bonded to at least two carbon atoms. A preferred organic compound satisfies formula (I) or (II):

$$(R^1R)N—R^3—N(R^{1\prime}R^{2\prime}) \quad (I)$$

$$N(R^1R^2R^{1\prime}) \quad (II)$$

wherein $R^1$, $R^2$, $R^{1\prime}$ and $R^{2\prime}$ are independently selected from alkyl, alkenyl, and allyl, with up to 10 carbon atoms optionally substituted with one or more groups selected from carbonyl, carboxyl, ester, ether, amino, or amido. $R^3$ is an alkylene group with up to 10 carbon atoms which may be interrupted by —O— or —$NR^4$—. $R^4$ is selected from the same group as indicated above for $R^1$. The $R^3$ alkylene group may be substituted with one or more groups selected from carbonyl, carboxyl, ester, ether, amino, or amido. As has been set out above, it is essential that the organic compound of formula (I) or (II) comprises at least one carbonyl moiety. Preferably, at least two of $R^1$, $R^2$, $R^{1\prime}$ and $R^{2\prime}$ (formula (I)) and at least two of $R^1$, $R^2$, and $R^{1\prime}$ (formula (II)) have the formula —$R^5$—C(O)OX, wherein $R^5$ is an alkylene group having 1-4 carbon atoms, and X is hydrogen or another cation, such as an ammonium, sodium, potassium and/or lithium cation. If X is a multivalent cation, one X can be bound to two or more —$R^5$—C(O)O— groups. Typical examples of a compound of formula (I) are ethylene diamine(tetra) acetic acid (EDTA), hydroxyethylene diamine triacetic acid, and diethylene triamine pentaacetic acid. A typical example of a compound of formula (II) is nitrilotri-acetic acid (NTA).

The catalyst composition typically comprises about 30 to about 45 wt. % of the total of at least one metal component of Group 6 of the Periodic Table of the Elements (alternatively referred to as Group VIB) and at least one metal component of Group 8, 9, or 10 of the Periodic Table of the Elements (alternatively referred to as Group VIIIB) or mixtures thereof, the Group VIB and Group VIIIB metal components calculated as oxides and based on the total weight of the catalyst composition. Furthermore, the total weight of the Group 6 and Group 8, 9 or 10 metal components comprise about 35 to 55 wt. % calculated as oxides and based on the total weight of the catalyst composition. Alternatively, the total weight of the Group 6 and Group 8, 9 or 10 metal oxide content is from about 35, 36, 37, 38, 39, 40, 41, 42, 43, 44, or 45 wt. %; to about 55, 54, 53, 52, 50, 49, 48, 47, 46, or 45 wt. %.

Specifically, the amount of the at least one Group 6 metal component comprises about 30 to about 45 wt. % calculated as an oxide; alternatively, from about 31, 32, 33, 34, 35, 36, 37, or 38 wt. %; to about 45, 44, 43, 42, 41, 40, 39, 38, 37, or 36 wt. %.

The Group VIIIB metal will usually be present in an amount of 3 to about 15 wt. %, alternatively about 3.5, 4, 5, 6, 7, 8, 9 or 10 wt. %; to about 15, 14, 13, 12, 11, 10, 9, 8, or 7 wt. %, calculated as the oxide. Phosphorus, when included, is usually present in an amount of about 1 to about 10 wt %, alternatively about 1.5, 2.5, 3, 4 or 5 wt. %; to about 6, 7, 8, 9 or 10 wt %, calculated as $P_2O_5$. The amount of Group VIB metals and Group VIIIB metals present in the catalyst composition can be measured using atomic absorption spectrometry (AAS), inductively-coupled plasmaspectrometer (ICP) analysis and/or x-ray fluorescence (XRF).

The supported catalyst composition following impregnation, drying and calcinations, i.e., wherein the metal-containing components and phosphorus (when included) are present as their oxides, and, preferably, prior to a sulfidation step, if any, exhibit the properties described above.

The term "agglomerate" refers to a product that combines particles that are held together by a variety of physical-chemical forces and the term "shaping" and grammatical variations thereof refers to the act of forming agglomerates. More specifically, each agglomerate is composed of a plurality of contiguous, constituent primary porous carrier particles, preferably joined, and connected at their points of contact. Thus, the agglomerates particles typically exhibit a higher macropore content than the constituent primary particles from which they are made because of the interparticle voids between the constituent composite particles. These larger voids are not included as part of the characterizing properties of the primary porous carrier particles, for example, specific pore sizes or ranges and pore size distribution characteristics.

Agglomeration of the porous carrier, e.g., alumina, composite is carried out in accordance with methods well known to the art, and, in particular, by such methods as pelletizing, extrusion, shaping into beads in a rotating coating drum, and the like. The modulizing technique whereby composite particles having a diameter of not greater than about 0.1 mm are agglomerated to particles with a diameter of at least about 0.8 mm by means of a granulation liquid may also be employed. As is known to those skilled in the art, agglomeration may optionally be carried out in the presence of additional amorphous or crystalline binders, and pore-forming agents may be added to the mixture to be agglomerated. Conventional binders include other forms of alumina, silica, silica-alumina, clays, zirconia, silica-zirconia, magnesia, and silica-boria. Conventional pore-forming agents can be used and examples of suitable agents include wood flour, wood charcoal, cellulose, starches, naphthalene, and, in general, organic compounds capable of enhancing pore formation and being removed by calcination. The addition of pore forming agents, however, is not necessary or desirable.

The catalyst composition may have different shapes selected for their suitability for the process and/or equipment in which they are to be used. For example, if the catalyst composition is to be used in slurry-type reactors, fluidized beds, moving beds, or expanded beds, generally spray-drying or beading is applied. For fixed bed or ebullating bed applications, generally the catalyst composition is extruded, pelletized, and/or beaded. In the latter case, at any stage prior to or during the shaping step, any additives, which are conventionally used to facilitate shaping, can be added. These additives may comprise aluminum stearate, surfactants, graphite, starch, methyl cellulose, bentonite, polyethylene glycols, polyethylene oxides, or mixtures thereof. Further, as discussed elsewhere, when alumina is used as the carrier, nitric acid is sometimes added prior to the shaping step for the purpose of, e.g., increasing the mechanical strength of the agglomerates. In the present invention the shaping step is carried out in the presence of water. For extrusion and beading, the amount of water in the shaping mixture, expressed as LOI, preferably is in the range of 20-80%. If required by the shaping operation, additional water can be added or, if the amount of water is too high, it can be reduced by, e.g., solid-liquid separation via, e.g., filtration, decantation, or evaporation. It is within the scope of the skilled person to control the amount of water appropriately.

Suitable shapes include powders, spheres, cylinders, rings, and symmetric or asymmetric polylobal forms, for instance tri- and quadrilobal. Particles resulting from extrusion, beading or pelleting usually have a diameter in the range of about 0.2 to about 10 mm, and lengths in the range of about 0.5 to about 20 mm, but deviations from these general ranges are possible. Catalysts in the form of extrudates are generally preferred.

The present invention is also directed to catalyst compositions according to the invention wherein the metal components have been converted partly or wholly into their sulfides. In that case, it is preferred for the catalyst to be essentially free from Group VIIIB metal disulfides.

Calcination is carried out according to temperatures and times described hereinabove. As described, calcination conditions, especially temperatures, for metals-containing (especially post-impregnated) supports or carriers are typically lower than those used for a support or carrier per se. Calcination may be carried out in an inert gas such as nitrogen, or in an oxygen-containing gas, such as air or pure oxygen, and optionally in the presence of steam. Preferably, the calcination is carried out in an oxygen-containing atmosphere.

Catalysts prepared by the methods described herein typically also exhibit a loss on ignition (LOI) measured at 550° C. (1022° F.) of from about 6 wt % to about 38 wt %; or from about 7 wt % or about 8 wt %, or about 9 wt %, or about 10 wt %, or about 11 wt % or about 12 wt %, or about 13 wt %, or about 14 wt %, or about 16 wt %, or about 18 wt %, or about 20 wt %; to about 37 wt %, or about 36 wt % or about 35 wt %, or about 34 wt %, or about 33 wt %, or about 32 wt %, or about 30 wt %, or about 28 wt %, or about 26 wt %, or about 24 wt %.

Furthermore, catalysts according to the invention are particularly useful in hydrocarbon conversion processes comprising contacting a hydrocarbon feedstock with a supported catalyst in particulate form under conditions of elevated temperature and elevated pressure with hydrogen, wherein the catalyst is made according to the present invention. As described herein, such catalysts comprise at least one catalytically active metal from Group 6 of the Periodic Table, and at least one catalytically active metal from Groups 8, 9 or 10 of the Periodic Table, and optionally phosphorous, wherein the metals and optionally phosphorous are carried on an alumina-containing carrier described hereinabove and the pore size distribution properties and other particle properties are also as described.

Use of the Catalysts in Hydroprocessing Processes

Catalysts prepared according to the present invention can be used in virtually all hydroprocessing processes to treat a plurality of feeds under wide-ranging reaction conditions, generally, for example, at temperatures in the range of about 200° C. to about 500° C., hydrogen pressures in the range of about 5 to 300 bar (0.5 MPa to 30 MPa), and liquid hourly space velocities (LHSV) in the range of about 0.05 to 10 h$^{-1}$. The term "hydroprocessing" encompasses various petroleum refinery processes in which a hydrocarbon feed is reacted with hydrogen at elevated temperature and elevated pressure (hydroprocessing reaction conditions), including hydrogenation, hydrodesulfurization, hydrodenitrification, hydrodemetallization, hydrodearomatization, hydrocracking, and hydrocracking under mild pressure conditions, which is also referred to as mild hydrocracking.

More specifically, "hydroprocessing" as the term is employed herein means oil refinery processes for reacting petroleum feedstocks (complex mixtures of hydrocarbon present in petroleum) with hydrogen under pressure in the presence of a catalyst to lower: (a) the concentration of at least one of sulfur, contaminant metals, nitrogen, and Conradson carbon, present in the feedstock, and (b) at least one of the viscosity, pour point, and density of the feedstock. Hydroprocessing includes hydrocracking, isomerization/dewaxing, hydrofinishing, and hydrotreating processes which differ by the amount of hydrogen reacted and the nature of the petroleum feedstock treated.

Hydrocracking is typically understood to involve the hydroprocessing of predominantly hydrocarbonaceous compounds containing at least five (5) carbon atoms per molecule ("feedstock") which is conducted: (a) at superatmospheric hydrogen partial pressure; (b) at temperatures typically below 593.3° C. (1100° F.); (c) with an overall net chemical consumption of hydrogen; and (d) in the presence of a solid supported catalyst containing at least one (1) hydrogenation component.

Hydrotreating is typically understood to involve the hydroprocessing of predominantly hydrocarbonaceous compounds containing at least five carbon atoms per molecule ("feedstock") for the desulfurization and/or denitrification of the feedstock, wherein the process is conducted: (a) at superatmospheric hydrogen partial pressure; (b) at temperatures typically below 593.3° C. (1100° F.); (c) with an overall net chemical consumption of hydrogen; and (d) in the presence of a solid supported catalyst containing at least one hydrogenation component.

The operating conditions for the hydrotreating of heavy hydrocarbon streams, such as petroleum hydrocarbon residua and the like, are well known in the art and comprise a pressure within the range of about 1,000 psia (68 atm) to about 3,000 psia (204 atm), an average catalyst bed temperature within the range of about 700° F. (371° C.) to about 850° F. (454° C.), a liquid hourly space velocity (LHSV) within the range of about 0.1 volume of hydrocarbon per hour per volume of catalyst to about 5 volumes of hydrocarbon per hour per volume of catalyst, and a hydrogen recycle rate or hydrogen addition rate within the range of about 2,000 standard cubic feet per barrel (SCFB) (356 m$^3$/m$^3$) to about 15,000 SCFB (2,671 m$^3$/m$^3$). Preferably, the operating conditions comprise a total pressure within the range of about 1,200 psia to about 2,000 psia (81-136 atm); an average catalyst bed temperature within the range of about 730° F. (387° C.) to about 820° F. (437° C.); and a LHSV within the range of about 0.1 to about 4.0; and a hydrogen recycle rate or hydrogen addition rate within the range of about 3,000 SCFB (534 m$^3$/m$^3$) to about 10,000 SCFB (1,781 m$^3$/m$^3$). Generally, the process temperatures and space velocities are selected so that at least 30 vol. % of the feed fraction boiling above 1,000° F. is converted to a product boiling below 1,000° F., more preferably at least 50 vol. % is converted to a product boiling below 1,000° F., and still more preferably so that at least 70 vol. % of the subject fraction is converted to a product boiling below 1,000° F.

For the treatment of hydrocarbon distillates, the operating conditions would typically comprise a hydrogen partial pressure within the range of about 200 psia (13 atm) to about 3,000 psia (204 atm); an average catalyst bed temperature within the range of about 600° F. (315° C.) to about 800° F. (426° C.); a LHSV within the range of about 0.4 volume of hydrocarbon per hour per volume of catalyst to about 6 volumes of hydrocarbon recycle rate or hydrogen addition rate within the range of about 1,000 SCFB (178 m$^3$/m$^3$) to about 10,000 SCFB (1,381 m$^3$/m$^3$). Preferred operating conditions for the hydrotreating of hydrocarbon distillates comprise a hydrogen partial pressure within the range of about 200 psia (13 atm) to about 1,200 psia (81 atm); an average catalyst bed temperature within the range of about 600° F. (315° C.) to about 750° F. (398° C.); a LHSV within the range of about 0.5 volume of hydrocarbon per hour per volume of catalyst to about 4 volumes of hydrocarbon per hour per volume of catalyst; and a hydrogen recycle rate or hydrogen addition rate within the range of about 1,000 SCFB (178 m$^3$/m$^3$) to about 6,000 SCFB (1,068 m$^3$/m$^3$).

The most desirable conditions for conversion of a specific feed to a predetermined product, however, can be best obtained by converting the feed at several different temperatures, pressures, space velocities and hydrogen addition rates, correlating the effect of each of these variables and selecting the best compromise of overall conversion and selectivity. The catalyst composition of the invention is particularly suitable for hydrotreating heavy hydrocarbon feedstocks, also referred to as feeds or feed blends.

The present invention, thus generally described, will be understood more readily by reference to the following examples, which are provided by way of illustration and are not intended to be limiting of the present invention.

EXAMPLES

Preparation of Supported Catalysts. Generally, catalyst metal impregnating solutions are prepared as follows:

Nickel and molybdenum containing solutions are prepared by combining water, a molybdenum source, a nickel source and aqueous ammonia in appropriate ratios. Various molybdenum and nickel sources as disclosed above may be used. The solutions are used to impregnate a calcined support to prepare the finished catalyst. The component weights and order of addition are selected to ensure solution stability and the selected target concentrations of metals on the finished catalyst for the intended catalyst use. Solution treatment temperatures and times are selected to ensure solution stability. Component weights, order of addition, treatment temperatures, and treatment times required are typical and generally known to those skilled in the art.

Comparative Example 1. (I) Preparation of Comparative Base

The following steps were followed in order to prepare the comparative base, also referred to in the disclosure as the carrier or support, for use in preparing the comparative catalyst:
 (1) Alumina was precipitated by reacting alum and sodium aluminate in a two-stage precipitation process in which temperature and pH is varied and controlled in each stage. See for example, US 2014/0367311, U.S. Pat. No. 6,589,908 or U.S. Pat. No. 6,984,310 (incorporated herein by reference). For example, in the first stage, one half of the total amount of aluminum sulfate and sodium aluminate are mixed to form precipitated seed alumina at about pH 8 and 55° C. (131° F.). Prior to addition of the second half of the aluminum sulfate and sodium aluminate in the second stage, temperature is increased to about 65° C. (150° F.), pH is increased to about 9, the reactants are mixed and the second stage precipitation is completed.
 (2) The resulting alumina is washed and mixed with a silica-alumina composition containing about 75 wt. % silica and 25 wt. % alumina.
 (3) The mixture from (2) was dried by introducing it into a heated auger.
 (4) The mixture from (3) was charged to an Eirich mixer with water, nitric acid, recycled base and catalyst fines from later in the process, and mixed until the resulting mixture was granulated.
 (5) The material from (4) was extruded to form the base or support precursor.
 (6) The extruded base precursor was introduced into a rotary calciner and heated until the volatiles level is reduced to <2% as determined by the loss on ignition test (LOI). LOI is a measure of the total volatiles or components capable of being volatilized at elevated temperature that are present in a sample. The LOI test is conducted by subjecting a sample to an oxygen-containing atmosphere for 1 hour at 1020° F. (548.9° C.), thereby degrading, oxidizing or igniting organic matter that may be present and driving off residual moisture to a targeted end-point.

(II) Comparative supported catalyst was prepared in the following way:
 (1) The base or support prepared in I above was added to a dip-soak impregnation basket.
 (2) The base was successively lowered and dipped into tanks containing the desired impregnation solution consisting of molybdenum, nickel, phosphorus, and a chelating agent at the desired concentrations.
 (3) The impregnated catalyst was thereafter conveyed through a rotary calciner, to the targeted LOI level of 5 wt %.

Inventive Example A

Base or support A was prepared as follows:
 (1) 1200 g of silica-alumina powder (on a volatiles free basis) containing 5 wt % silica dispersed in alumina was charged to an Eirich mixer at room temperature.
 (2) 17.15 g of concentrated nitric acid (70 wt % $HNO_3$) and 2000 g of deionized water was added to the mixer at a rate of approximately 150 cc/minute. The composition was mixed for a total of 5 min (including water addition time).
 (3) Mixing was stopped to scrape the sides of the mixer at which time small portions of water (20 g each) were added, as necessary to form an extrudable paste.
 (4) The LOI of the paste was determined to be 69%, which was suitable for extrusion.
 (5) The paste mixture obtained in (4) was extruded using 1/16" AQ plastic insert dies and a water cooled extruder barrel.
 (6) The extrudates were placed on a screen tray about ½ inch deep and placed in a preheated Gruenberg drying oven at 250° F. (121.1° C.) for two hours followed by 400° F. (204.4° C.) for 2 additional hours.
 (7) 200 g of the dried extrudates from (6) were calcined in a furnace at 1400° F. (760° C.) for 40 min using 2 SCFH (standard cubic feet per hour) dry air.
 (8) The calcined extrudates were then cooled to room temperature.

Catalyst sample A was prepared as follows:
 (1) 50 g of base A (on a volatiles free basis) prepared above is weighed out.
 (2) The base in (1) was impregnated according to the incipient wetness method using an aqueous solution containing molybdenum, nickel, phosphorus, and a chelating agent at the desired concentrations.
 (3) The impregnated samples from (2) were heated at 400° F. (204.4° C.) for 40 min.
 (4) The resulting catalyst sample A was cooled to room temperature.

Catalyst sample A was prepared as follows:
 (1) 50 g of base A (on a volatiles free basis) prepared above is weighed out.
 (2) The base in (1) was impregnated according to the incipient wetness method using an aqueous solution containing molybdenum, nickel, phosphorus, and a chelating agent at the desired concentrations.
 (3) The impregnated samples from (2) were heated at 400° F. (204.4° C.) for 40 min.
 (4) The resulting catalyst sample A was cooled to room temperature.

Inventive Example B

The base or support for catalyst sample B (including recycled fines) was prepared as follows:
 (1) 1200 g of silica-alumina powder (on a volatiles free basis) containing 5 wt % silica dispersed in alumina was charged to an Eirich mixer at room temperature.
 (2) 60 g of ground Catalyst B fines (recycled fines) and 60 g of ground Base B fines (recycled fines) were added to the mixer.

(3) 17.1 g of concentrated nitric acid (70 wt % $HNO_3$) and 2000 g of deionized water were added to the mixer and mixing was initiated.
(4) The mixer was stopped to scrape the sides and additional water as needed to produce the desired paste consistency.
(5) After 10 min, the mixture formed granulates having an LOI of 66.2% LOI.
(6) The mixture from (5) was extruded using the 1/16" AQ plastic insert dies and a water cooled extruder barrel.
(7) The extrudates were placed into a drying oven at 250° F. (121.1° C.) for 2 hr.
(8) The dried extrudates from (7) were introduced into a rotary calciner according to the following protocol: load at 250° F. (121.1° C.); hold for 10 min, ramp up to 1400° F. (760° C.) for 40 min and hold at 1400° F. (760° C.) for 40 min.
(9) The calcined base was thereafter cooled to room temperature.

Catalyst sample B was prepared as follows:
(1) 175 g of the base (on a volatiles free basis) from (9) above were weighed.
(2) The base from (1) was impregnated using the dip soak impregnation method with an aqueous solution containing molybdenum, nickel, phosphorus, and a chelating agent at the desired concentrations.
(3) The impregnated base from (2) was introduced into a rotary calciner according to the following protocol: 320° F. (160° C.) for 10 min; then ramped up to 670° F. (354.4° C.) for 40 min; and hold at 670° F. (354.4° C.) for 10 min.
(4) The resulting supported Catalyst B was then cooled to room temperature.

Pore size distributions (PSD) of the Comparative and Inventive bases (supports) and catalysts prepared as described above were determined using the standard Hg porosimetry method identified hereinabove; the distributions are shown in FIGS. 1A-C and FIG. 2A-C.

FIGS. 1A-1C show the PSD comparison between the three catalyst bases. The bulk property and chemical composition comparison between the three catalyst bases is summarized below in Table 1. The PV (pore volume, in other words, the total pore volume) of the Exemplary Base A is about 20% higher than that of the Comparative Base, while the PV of the Exemplary Base B (including fines) is 15% higher.

FIGS. 2A-C show the PSD comparison between the three catalysts prepared in the above examples. The bulk property and chemical composition comparison between the three catalysts is summarized in Table 2 below. It will be observed that the total metal loadings of Exemplary Catalysts A and B are higher than that of the Comparative Catalyst.

TABLE 1

Chemical composition and physical properties of the three catalyst bases prepared according to the above examples:

|  |  | Catalyst Base | | |
|---|---|---|---|---|
|  |  | Comparative Base | Exemplary Base A | Exemplary Base B |
|  | Size and Shape | 1/16" AQ | 1/16" AQ | 1/16" AQ |
|  | BET SA, $m^2/g$: | 254 | 321 | 316 |
|  | $N_2$ PV, cc/g: | 0.824 | 1.046 | 0.987 |
| d50 | Hg PSD/$N_2$ PSD | 114/98 | 131/102 | 134/102 |
| Hg PV | Total PV, cc/g | 0.82 | 1.18 | 1.29 |
|  | 1000+ Å PV[‡], cc/g | 0.02 | 0.21 | 0.259 |
|  | 1000+ Å PV, % | 2.4 | 17.8 | 20.1 |
|  | <1000 Å PV, cc/g | 0.8 | 0.97 | 1.031 |
|  | <1000 Å PV, % | 97.6 | 82.2 | 79.9 |
|  | 200-1000 Å PV, cc/g | 0.09 | 0.22 | 0.231 |
|  | 200-1000 Å PV, % | 11.0 | 18.6 | 17.9 |
|  | <200 Å PV, cc/g | 0.71 | 0.75 | 0.80 |
|  | <200 Å PV, % | 86.6 | 63.6 | 62.1 |
|  | 100-200 Å PV, cc/g | 0.47 | 0.4 | 0.46 |
|  | 100-200 Å PV % | 57.3 | 33.9 | 35.7 |
|  | <100 Å PV[‡‡], cc/g | 0.24 | 0.35 | 0.34 |
|  | <100 Å PV % | 29.3 | 29.7 | 26.4 |
| Chemical | $Al_2O_3$ | 93.4 | 95.0 | 92.5 |
| composition, | $MoO_3$ | 2.9 | 0.0 | 1.8 |
| wt %* | NiO | 2.5 | 0.0 | 0.4 |
|  | $P_2O_5$ | 0.6 | 0.0 | 0.3 |
|  | $SiO_2$ | 0.6 | 5.0 | 4.9 |

[‡]Pores in the range 1000 Å (100 nm) to 30,000 Å (3,000 nm)

[‡‡]Pores in the range 20 Å (2 nm) to 100 Å (10 nm)

*Presence of Mo/Ni/P/Si in Comparative Base and Exemplary Base B due to recycled fines

TABLE 2

Chemical composition and physical properties of the three hydrotreating catalysts prepared according to the above examples

| | | Catalyst | | |
|---|---|---|---|---|
| | | Comparative Catalyst | Exemplary Catalyst A | Exemplary Catalyst B |
| | Size and Shape | 1/16" AQ | 1/16" AQ | 1/16" AQ |
| | Dry CBD, g/cc | 0.8 | 0.75 | 0.77 |
| | PD, g/cc | 1.38 | 1.37 | 1.33 |
| | BET SA, m2/g: | 154 | 109 | 122 |
| | $N_2$ PV, cc/g: | 0.42 | 0.322 | 0.322 |
| d50 | Hg PSD/$N_2$ PSD | 150/91 | 157/89 | 197/74 |
| Hg PV | Total PV, cc/g | 0.424 | 0.447 | 0.466 |
| | 1000+ Å PV‡, cc/g | 0.016 | 0.099 | 0.127 |
| | 1000+ Å PV % | 3.8 | 22.1 | 27.3 |
| | <1000 Å PV, cc/g | 0.408 | 0.348 | 0.339 |
| | <1000 Å PV, % | 96.2 | 77.9 | 72.7 |
| | 200-1000 Å PV, cc/g | 0.018 | 0.091 | 0.102 |
| | 200-1000 Å PV, % | 4.2 | 20.4 | 21.9 |
| | <200 Å PV, cc/g | 0.39 | 0.262 | 0.238 |
| | <200 Å PV, % | 92.0 | 58.6 | 51.1 |
| | 100-200 Å PV, cc/g | 0.321 | 0.203 | 0.198 |
| | 100-200 Å PV % | 75.7 | 45.4 | 42.5 |
| | <100 Å PV‡‡, cc/g | 0.069 | 0.054 | 0.039 |
| | <100 Å PV % | 16.3 | 12.1 | 8.4 |
| | LOI (550° C.), approximate wt % | 5 | 32 | 10 |
| Chemical composition, wt % | $Al_2O_3$ | 60.5 | 45.8 | 45.8 |
| | $MoO_3$ | 25 | 36 | 36 |
| | NiO | 6 | 7.2 | 7.2 |
| | $P_2O_5$ | 6.5 | 6.0 | 6.0 |
| | $SiO_2$ | 2 | 2.5 | 2.5 |

‡Pores in the range 1000 Å (100 nm) to 30,000 Å (3,000 nm)
‡‡Pores in the range 20 Å (2 nm) to 100 Å (10 nm)

Exemplary Catalysts A and B and the Comparative Catalyst were tested under the following bench scale unit (BSU) test protocol:

Total pressure=2300 psi $H_2$/Oil=5500 SCFB

LHSV=−2.0 h−1

Figure 3:
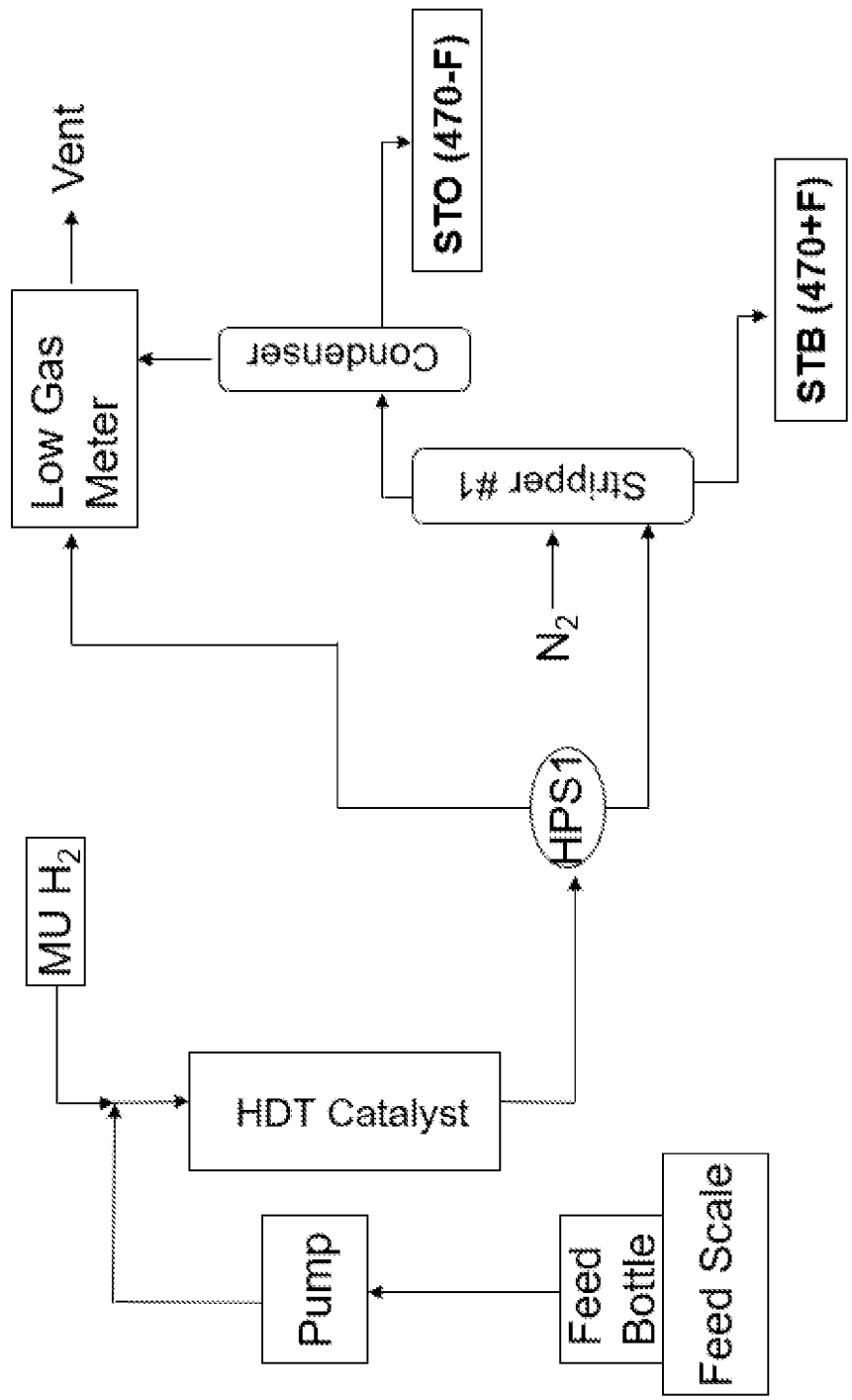
FIG. 3 is a simplified flow diagram for the bench scale unit (BSU) used for testing the petroleum hydrotreating performance of supported catalysts prepared in the examples.

CAT (Catalyst temperature): 710° F. (376.7° C.) for 7 days, followed by 720° F. (382.2° C.) for 5 days, followed by 735° F. (390.6° C.) for 5 days Feed: Vacuum Gas Oil (VGO) feed blend having the following properties: API (American Petroleum Institute specific gravity)=19.7, N=1810 ppm, S=27150 ppm A simplified flow diagram of the bench scale test unit (BSU) used to conduct the performance tests using the catalysts prepared in the examples is shown in FIG. 3. Gas recycle was not used in the BSU operation. The whole liquid product (WLP) was sent to an on-line stripper with a cut point controlled at target. Samples from the stripper overhead (STO), stripper bottom (STB), and gas bulb were collected and inspected daily for properties. The cut point target for STO product and STB product was 470° F. (243.3° C.), so as to produce STB product having boiling point greater than 470° F. (243.3° C.).

Test Results

Comparison of the catalysts in VGO hydrodenitrification (HDN), hydrodesulfurization (HDS), and hydrogenation of aromatics or hydrodearomatization (HDA) is shown in Table 3 and effects on product viscosity in Table 4 (note that here apparent conversion is used to represent HDA).

TABLE 3

VGO HDN, HDS, and HDA comparison of the above catalysts

| | | Catalyst Temp. ° F. (° C.) | | |
|---|---|---|---|---|
| Catalyst | Property | 710 (376.7) | 720 (382.2) | 735 (390.6) |
| Comparative Catalyst | Product N, ppm | 77.53 | 23.5 | 2.28 |
| | kHDN | 6.43 | 8.84 | 13.23 |
| | Product S, ppm | 1009.87 | 373.52 | 47.08 |
| | kHDS | 6.72 | 8.47 | 12.59 |
| | Apparent conversion, % (@700° F. (371.1° C.)) | 31.58 | 33.79 | 40.63 |
| Exemplary Catalyst A | Product N, ppm | 16.6 | 2.86 | 0.67 |
| | kHDN | 9.32 | 12.8 | 15.68 |
| | kHDN(Cat A)/kHDN(Comp) | 1.45 | 1.45 | 1.19 |
| | Product S, ppm | 336.77 | 96.59 | 19.67 |
| | kHDS | 8.92 | 11.19 | 14.34 |
| | kHDS(Cat A)/kHDS(Comp) | 1.33 | 1.32 | 1.14 |
| | Apparent conversion, % (@700° F. (371.1° C.)) | 34.47 | 38.54 | 43.14 |
| Exemplary Catalyst B (Including Fines) | Product N, ppm | 31.12 | 5.2 | 0.92 |
| | kHDN | 8.06 | 11.64 | 15.08 |
| | kHDN(Cat B)/kHDN(Comp) | 1.25 | 1.32 | 1.14 |
| | Product S, ppm | 513.23 | 149 | 25.69 |
| | kHDS | 7.87 | 10.33 | 13.55 |
| | kHDS(Cat B)/kHDS(Comp) | 1.17 | 1.22 | 1.08 |
| | Apparent conversion, % (@700° F. (371.1° C.)) | 33.48 | 37.78 | 42.79 |

Referring to Table 3, Exemplary Catalyst A is more active than Comparative Catalyst for HDN, HDS, and HDA (or HCR) while the Exemplary Catalyst B (including fines) is also more active. The table also includes the ratios of kHDS and kHDN (reaction rates for the indicated reactions) for the exemplary catalysts to the comparative catalyst, which further illustrate in each instance an advantage for the exemplary catalysts.

Figure 4A:
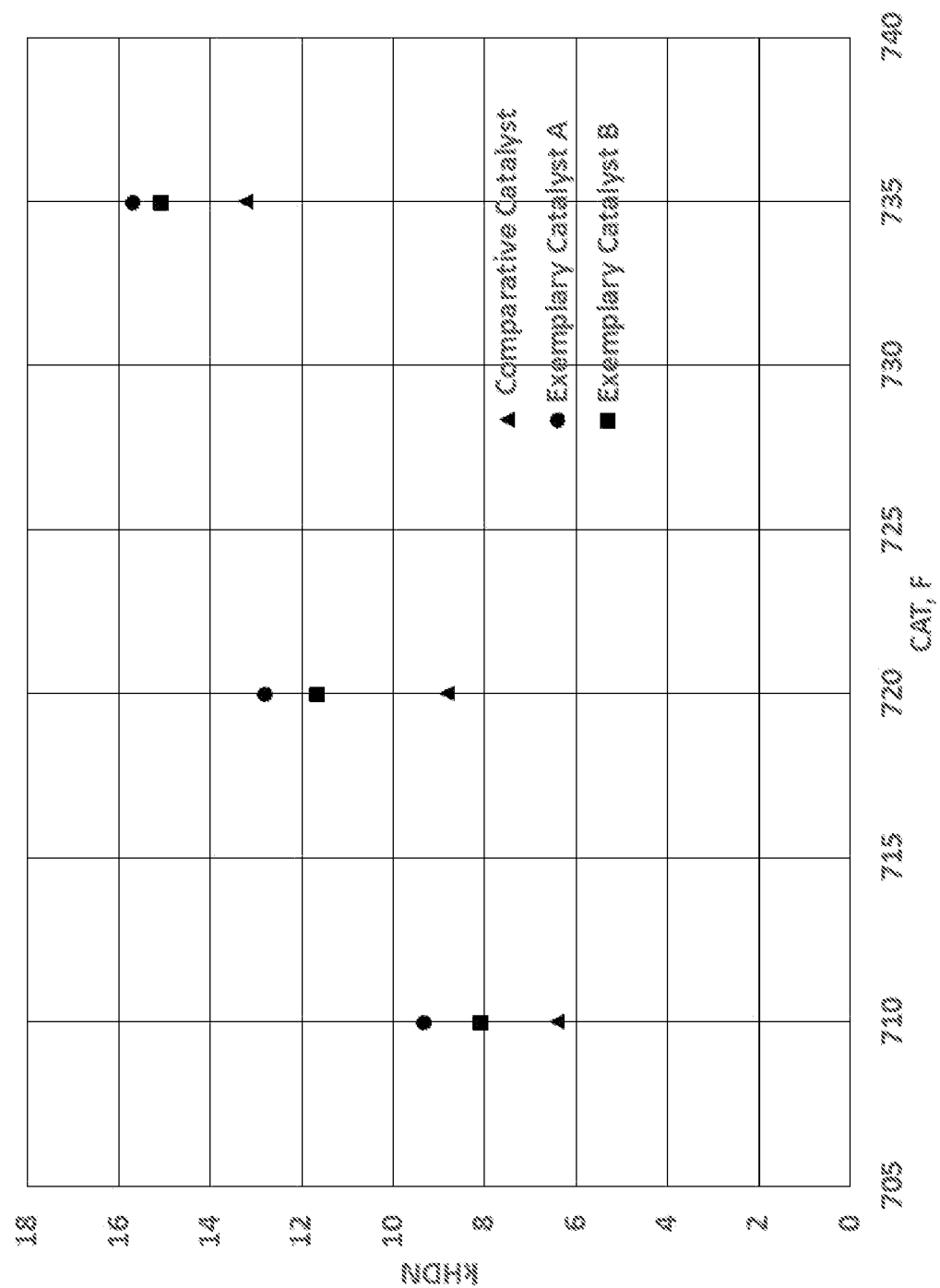
FIG. 4A is a plot of reaction rate for hydrodenitrification (kHDN) as a function of catalyst or operating temperature of the bench scale unit for the comparative and exemplary catalysts.
Figure 4B:
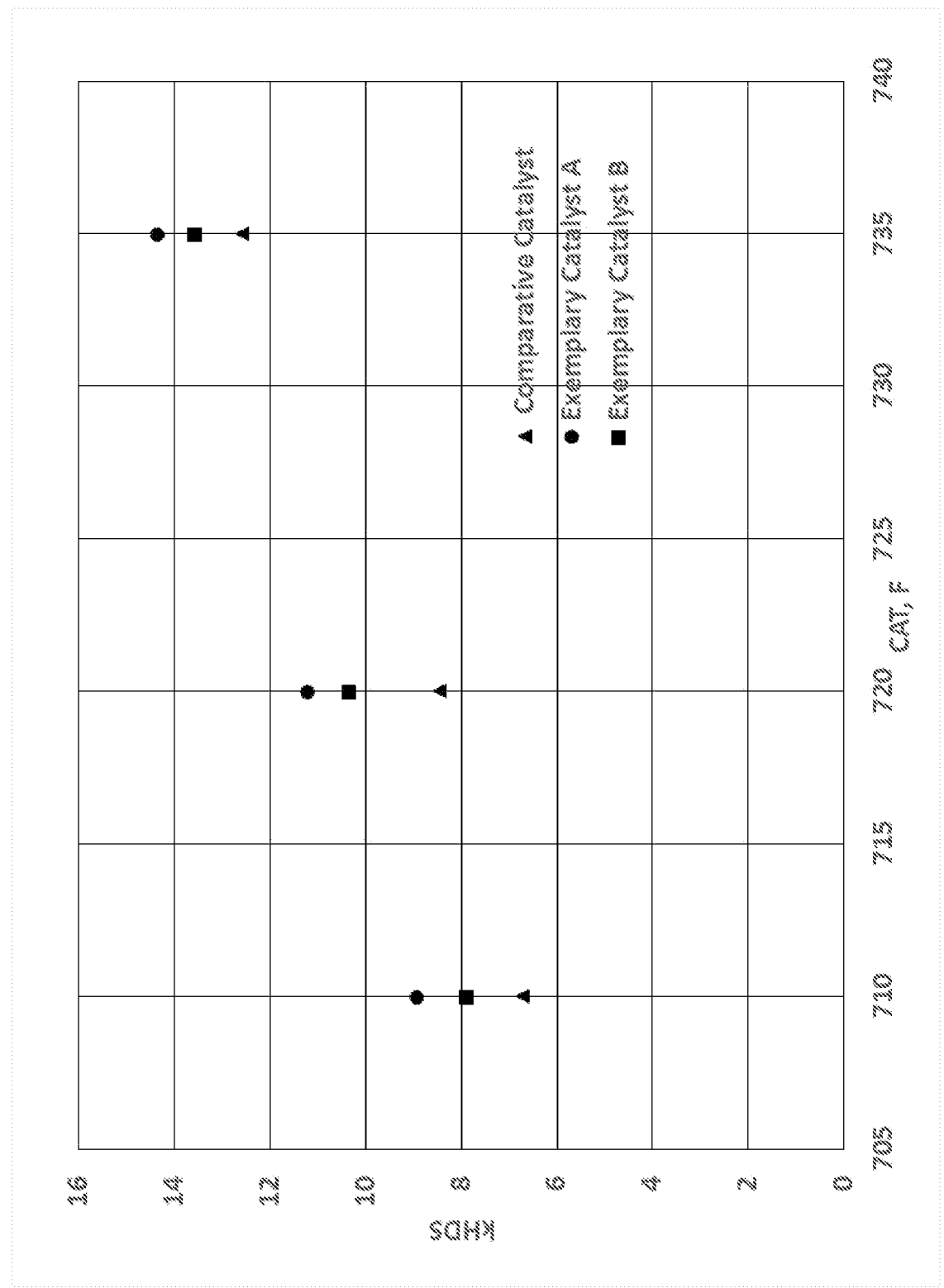
FIG. 4B is a plot of reaction rate for hydrodesulfurization (kHDS) as a function of catalyst or operating temperature of the bench scale unit for the comparative and exemplary catalysts.
Figure 4C:
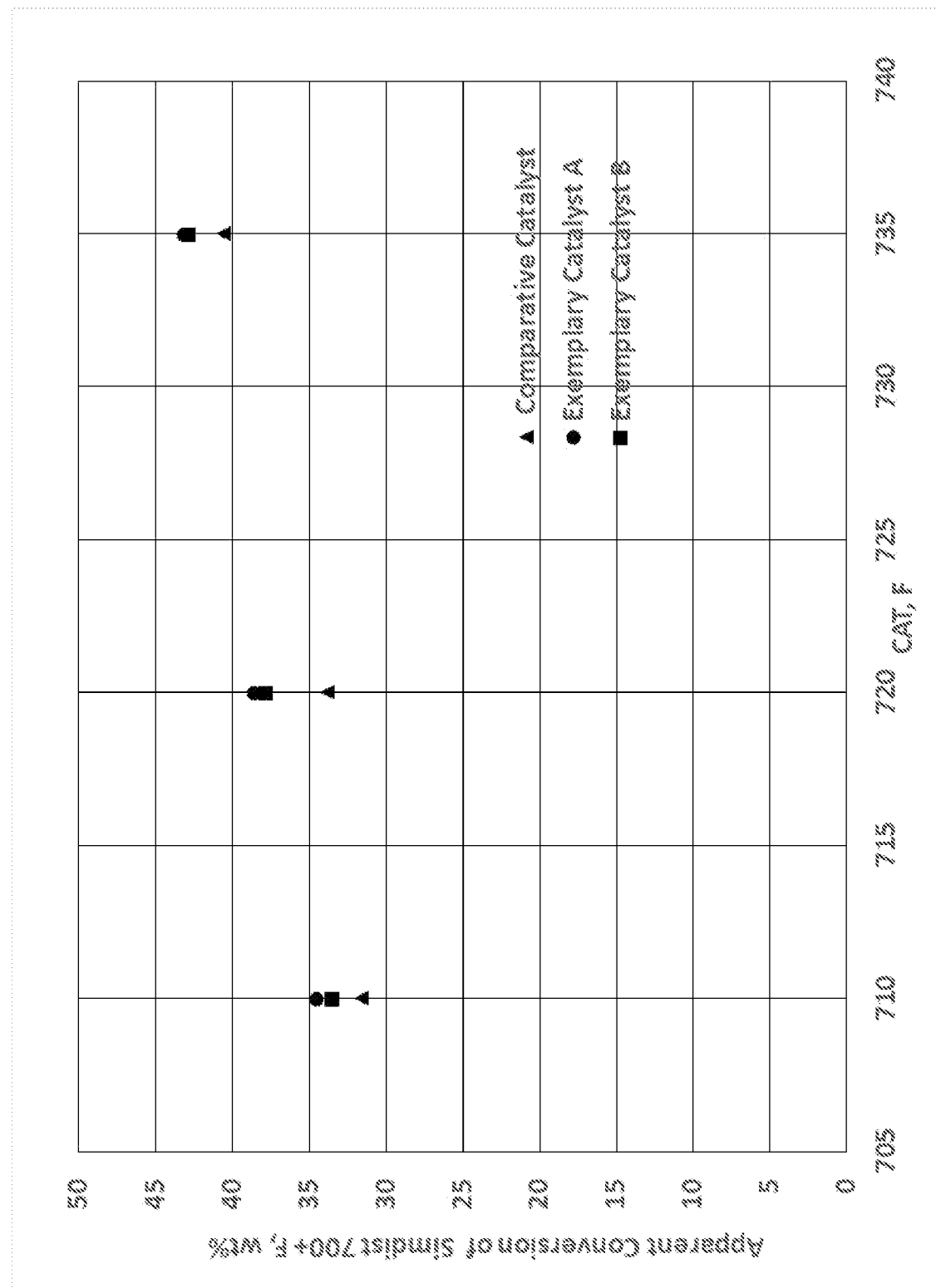
FIG. 4C is a plot of apparent conversion as a function of catalyst temperature in the bench scale unit for the comparative and exemplary catalysts.

The improved performance or catalyst activity of the inventive catalyst can also be observed in FIGS. 4A-4C and 5A-5C. FIG. 4A is a plot of reaction rate for hydrodenitrification (kHDN) as a function of catalyst or operating temperature of the bench scale unit for the comparative and exemplary catalysts. It will be observed that the Exemplary Catalysts are more effective at a given temperature or that equivalent HDN performance of the Exemplary Catalysts can be achieved at a lower temperature. Analogous advantageous results for the catalysts of the invention are observed in FIG. 4B for HDS and FIG. 4C for apparent conversion at 700° F. or hydrocracking to produce a higher concentration of paraffins. Thus, when supported catalysts of the invention are employed in a hydroprocessing process for the removal of sulfur, nitrogen, or hydrogenation of aromatics, the levels of these components in the treated hydrocarbon product is measurably improved as a function of the operating temperature of the process. Although operating at higher temperatures can result in a lower content of sulfur or nitrogen or aromatics in the treated product, doing so comes at the expense of the higher cost to operate at higher temperatures.

Figure 5A:
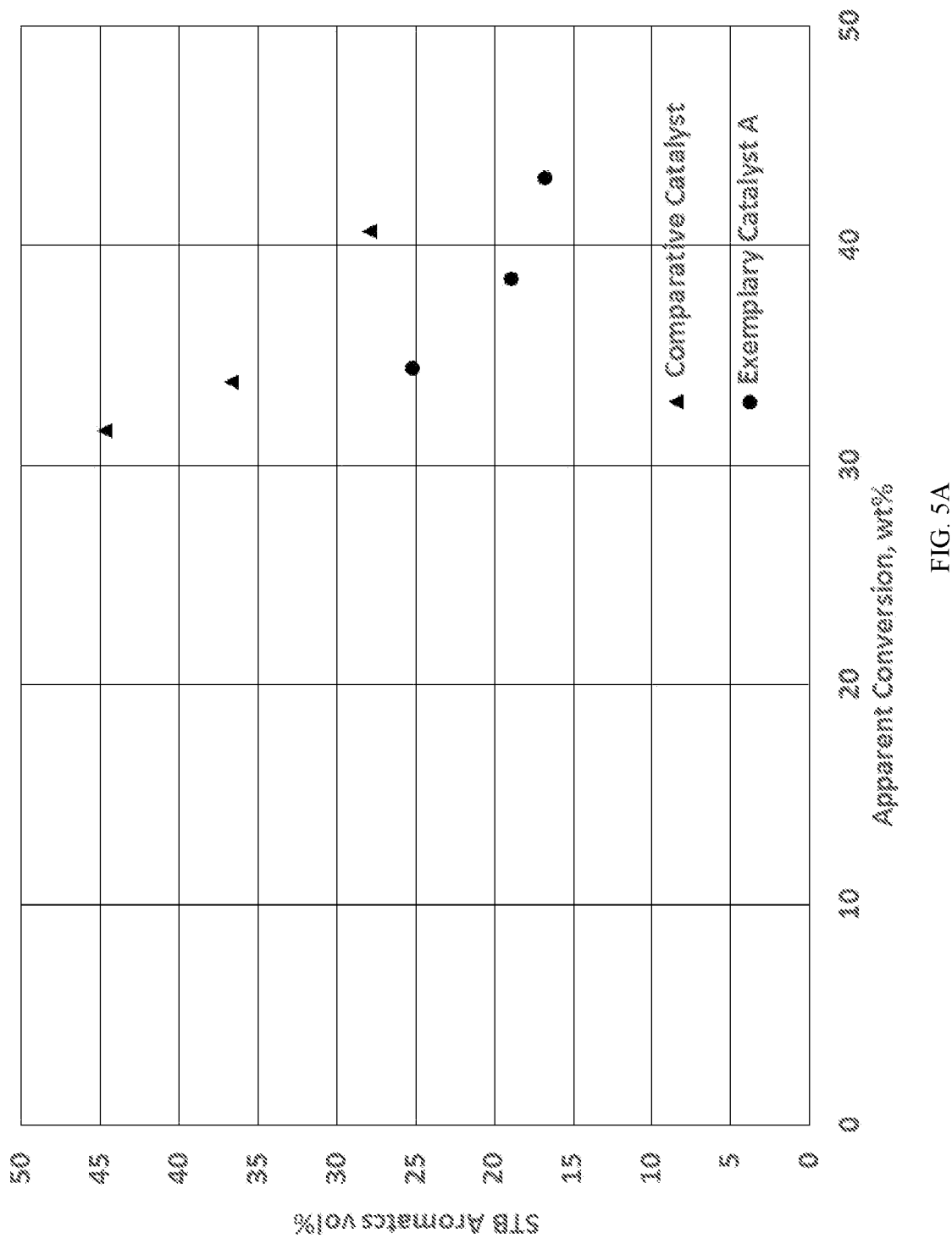
FIG. 5A is a plot of the volume percent of aromatics in the stripper bottoms (STB) of the bench scale unit for performance evaluation of the Comparative Catalyst and Exemplary Catalyst A as a function of apparent conversion.
Figure 5B:
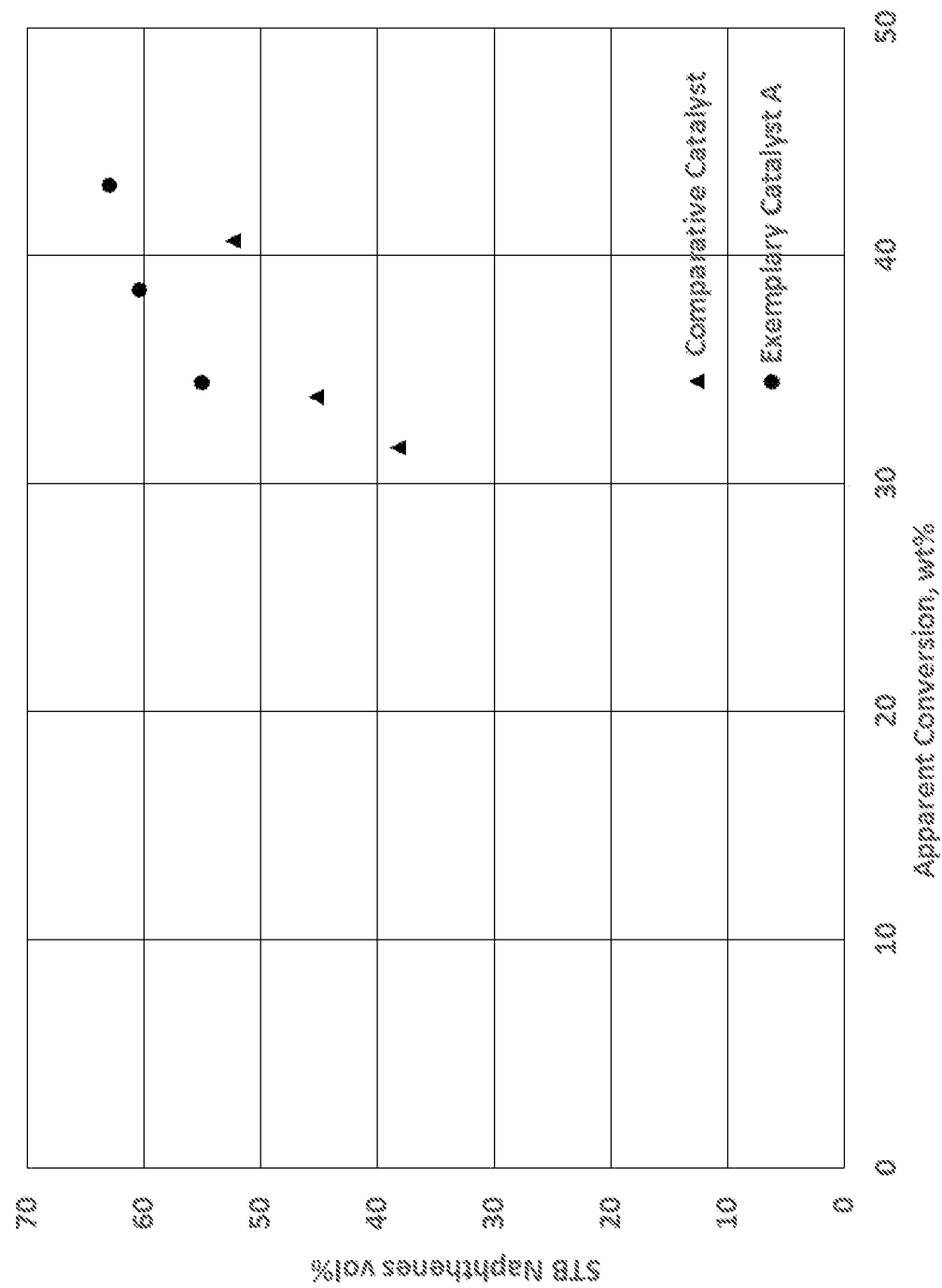
FIG. 5B is a plot of the volume percent of naphthenes in the stripper bottoms (STB) of the bench scale unit for performance evaluation of the Comparative Catalyst and Exemplary Catalyst A as a function of apparent conversion.
Figure 5C:
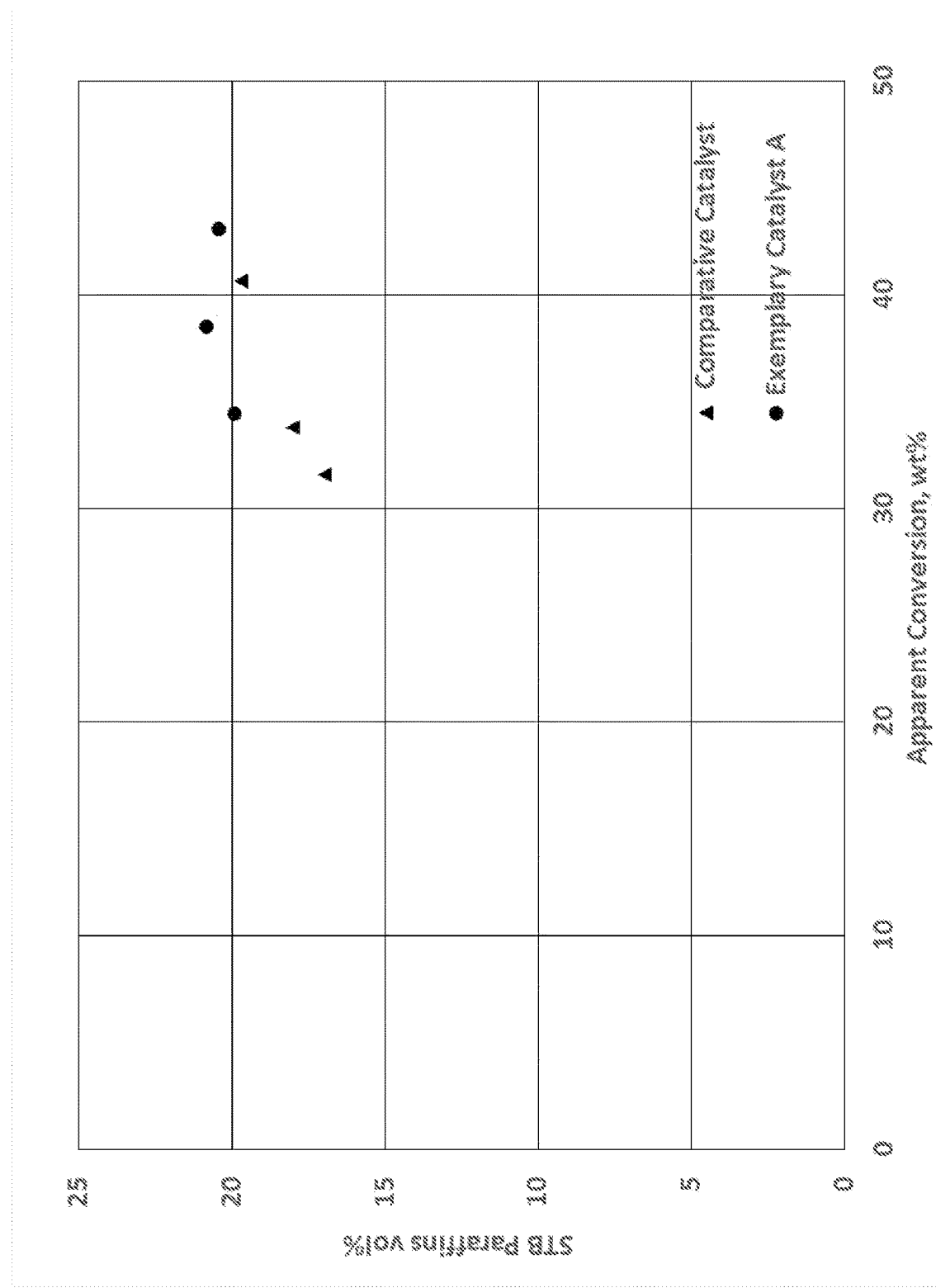
FIG. 5C is a plot of the volume percent of paraffins in the stripper bottoms (STB) of the bench scale unit for performance evaluation of the Comparative Catalyst and Exemplary Catalyst A as a function of apparent conversion.

Similarly, improved performance of the inventive catalysts can be seen in FIGS. 5A, 5B and 5C, which illustrate the volume percent of aromatics, naphthenes and paraffins, respectively, in the stripper bottoms (STB) of the bench scale unit which was used to evaluate performance of Exemplary Catalyst A versus the Comparative Catalyst as a function of Apparent Conversion. In each instance, a significant improvement can be observed, which improvement is more significant at a lower operating temperature, itself an advantageous benefit.

Improved performance using the inventive supported catalysts herein was also achieved according to improvement in product viscosity at 100° C. and viscosity index (VI) comparing the Comparative Catalyst to Exemplary Catalyst A prepared in the examples herein; results are summarized in Table 4. The following improvements were achieved by the inventive catalyst: the STB and WLP viscosities at 100° C. of Exemplary Catalyst A were lower than that of the Comparative Catalyst, while the STB VI were higher.

TABLE 4

Product Viscosity @ 100° C. and Viscosity Index (VI)

| | | Catalyst Temp, ° F. (° C.) | | |
|---|---|---|---|---|
| Catalyst | | 710 (376.7) | 720 (382.2) | 735 (390.6) |
| Comparative Catalyst | STB Vis 100° C., cSt | 5.018 | 4.798 | 4.276 |
| | STB VI | 98 | 100 | 108 |
| | WLP Vis 100° C., cSt | 4.460 | 4.197 | 3.840 |
| Exemplary Catalyst A | STB Vis 100° C., cSt | 4.706 | 4.352 | 4.039 |
| | STB VI | 101 | 106 | 110 |
| | WLP Vis 100° C., cSt | 4.321 | 3.808 | 3.489 |

The above data demonstrate that the combination of a higher catalyst metal loading, higher base pore volume and a higher concentration of larger pores are major characteristics leading to Exemplary Catalyst A demonstrates higher VGO HDN, HDS, and HDA activity. Even with the addition of recycle fines to the base, in other words, Exemplary Catalyst B (in the above tables and in the figures) maintains an activity advantage for HDN, HDS and HDA.

Comparative Catalyst and Catalyst A prepared according to the above examples were further evaluated in the BSU under the following conditions using the same feed blend as described above.

| Catalyst | Comparative | | | Exemplary Catalyst A | | |
|---|---|---|---|---|---|---|
| Run Time, Hours | 166 | 262 | 406 | 164 | 284 | 404 |
| Temp., ° F. | 710 | 720 | 735 | 710 | 720 | 735 |
| ° C. | 376.7 | 382.2 | 390.6 | 376.7 | 382.2 | 390.6 |
| WHSV | 2.42 | 2.34 | 2.35 | 2.51 | 2.51 | 2.51 |
| LHSV | 2.042 | 1.976 | 1.981 | 1.986 | 1.985 | 1.984 |
| Tot. P, psig | 2310 | 2300 | 2330 | 2300 | 2300 | 2300 |
| Inlet $H_2$ P, psia | 2178 | 2173 | 2201 | 2172 | 2172 | 2172 |
| Gas Rate, SCFB | 5276 | 5453 | 5438 | 5410 | 5412 | 5416 |

Hydrocarbon types in STB from the BSU tests as measured by GC-MS are summarized in Table 5 below.

TABLE 5

Hydrocarbon types in STB from the BSU Tests (Measured by GC-MS)

| | | Catalyst Temp, ° F. (° C.) | | |
|---|---|---|---|---|
| | | 710 | 720 | 735 |
| Catalyst | GC-MS Hydrocarbon types | (376.7) | (382.2) | (390.6) |
| Comparative Catalyst | STB Paraffins, vol % | 17 | 18 | 19.7 |
| | STB Naphthenes, vol % | 38.3 | 45.3 | 52.4 |
| | STB Aromatics, vol % | 44.7 | 36.7 | 27.9 |
| Exemplary Catalyst A | STB Paraffins, vol % | 19.9 | 20.8 | 20.4 |
| | STB Paraffins Ratio (Exe Cat A)/(Com Cat), vol/vol | 1.17 | 1.16 | 1.04 |
| | STB Naphthenes, vol % | 55 | 60.3 | 62.9 |
| | STB Naphthenes Ratio (Exe Cat A)/(Com Cat), vol/vol | 1.44 | 1.33 | 1.20 |
| | STB Aromatics, vol % | 25.1 | 18.9 | 16.7 |
| | STB Aromatics Ratio (Exe Cat A)/(Com Cat), vol/vol | 0.56 | 0.51 | 0.60 |

As can be seen, compared to the Comparative Catalyst, use of Catalyst A according to the present invention resulted in increased paraffins content, significantly increased naphthenes content and significantly reduced aromatics content in the treated feedstock.

Further data was obtained from BSU tests using the same feed as above and measuring product properties comparing the comparative supported catalyst and Exemplary Catalyst A prepared according to the above examples. Test results are summarized in the following Tables 6 Å (Comparative Catalyst) and 6B (Exemplary Catalyst A). In each instance, the same feed was used as in the previous table, and Simdist=Simulated distillation according to ASTM D2887.

TABLE 6A

| Catalyst | Feed* | Catalyst Temp. | | | | | | | | |
|---|---|---|---|---|---|---|---|---|---|---|
| | | 710° F./376.7° C. | | | 720° F./382.2° C. | | | 735° F./390.6° C. | | |
| | | Run Time, hrs. | | | | | | | | |
| | | 166 | | | 286 | | | 406 | | |
| | | STO | STB | WLP | STO | STB | WLP | STO | STB | WLP |
| | | Comparative Catalyst | | | | | | | | |
| API | 19.7 | | 26.5 | 27.1 | | 27.3 | 28.0 | | 29.3 | 30.6 |
| Density, g/cc | 0.936 | | 0.896 | 0.892 | | 0.891 | 0.887 | | 0.880 | 0.873 |
| STB or STO, normalized wt %* | | 3.1 | 96.9 | | 4.5 | 95.5 | | 9.1 | 90.9 | |
| Simdist (wt %), ° F. | | | | | | | | | | |
| 0.5 | 509 | 185 | 481 | 185 | 169 | 471 | 166 | 138 | 462 | 138 |
| 5 | 617 | 245 | 561 | 524 | 234 | 553 | 497 | 215 | 533 | 399 |
| 10 | 656 | 283 | 605 | 582 | 272 | 597 | 564 | 234 | 576 | 491 |
| 30 | 745 | 374 | 710 | 700 | 364 | 705 | 691 | 323 | 688 | 653 |
| 50 | 807 | 422 | 781 | 759 | 417 | 778 | 753 | 388 | 767 | 727 |
| 70 | 869 | 459 | 846 | 824 | 458 | 844 | 821 | 434 | 835 | 804 |
| 90 | 953 | 510 | 936 | 905 | 507 | 938 | 905 | 486 | 929 | 892 |
| 95 | 991 | 547 | 975 | 934 | 536 | 980 | 935 | 510 | 969 | 922 |
| 99.5 | 1076 | 649 | 1065 | 1065 | 629 | 1110 | 1097 | 609 | 1066 | 1055 |

*Normalized wt % = product weight/feed weight × 100

TABLE 6B

| Catalyst | Feed* | Catalyst Temp. | | | | | | | | |
|---|---|---|---|---|---|---|---|---|---|---|
| | | 710 F./376.7° C. | | | 720 F./382.2° C. | | | 735 F./390.6° C. | | |
| | | Run Time, hrs. | | | | | | | | |
| | | 164 | | | 284 | | | 404 | | |
| | | STO | STB | WLP | STO | STB | WLP | STO | STB | WLP |
| | | Exemplary Catalyst A | | | | | | | | |
| API | 19.7 | 35.8 | 28.6 | | 37.4 | 29.2 | | 39.3 | 31.3 | |
| Density, g/cc | 0.936 | 0.846 | 0.884 | | 0.838 | 0.881 | | 0.828 | 0.869 | |
| STB or STO, normalized wt %* | | 4.6 | 95.4 | | 7.1 | 92.9 | | 10.2 | 89.8 | |
| Simdist (wt %), ° F. | | | | | | | | | | |
| 0.5 | 509 | 181 | 456 | 181 | 154 | 445 | 157 | 141 | 438 | 154 |
| 5 | 617 | 243 | 546 | 492 | 216 | 532 | 442 | 214 | 519 | 388 |
| 10 | 656 | 279 | 592 | 557 | 252 | 578 | 519 | 242 | 563 | 475 |
| 30 | 745 | 364 | 702 | 686 | 338 | 692 | 666 | 324 | 679 | 639 |
| 50 | 807 | 416 | 776 | 749 | 396 | 770 | 735 | 385 | 760 | 717 |
| 70 | 869 | 467 | 842 | 819 | 444 | 838 | 810 | 433 | 829 | 796 |
| 90 | 953 | 554 | 933 | 901 | 526 | 930 | 895 | 512 | 925 | 886 |
| 95 | 991 | 599 | 972 | 930 | 572 | 969 | 925 | 558 | 964 | 917 |
| 99.5 | 1076 | 696 | 1062 | 1062 | 678 | 1059 | 1059 | 672 | 1056 | 1045 |

*Normalized wt % = product weight/feed weight × 100

The petroleum feedstock used in the BSU tests of the catalysts was selected because it exhibited a lower VI, higher viscosity, and higher content of aromatics plus S compounds, all of which it was desirable to improve. The following conclusions and observations have been made in view of the BSU tests results:

1. At each of the run conditions using Exemplary Catalyst A, STB product VI is higher, and viscosity and total aromatic content are lower, both desirable results.
2. As catalyst concentration increases, STB product VI increases and viscosity and total aromatic content decrease; also desirable.
3. At each of the run conditions, hydrocracking conversion to 700° F. using Exemplary Catalyst A is higher than that of the Comparative Catalyst, clearly an advantage.
4. Exemplary Catalyst A results in higher apparent conversion and thus lower STB product aromatic content, and higher paraffin and naphthene content versus Comparative Catalyst.
5. At each of the run conditions, Exemplary Catalysts A and B exhibit higher HDN/HDS activity than the Comparative Catalyst.

Alternative Embodiments

The following enumerated paragraphs illustrate various and alternative embodiments of the present invention:

1. A supported catalyst comprising at least one metal from Group 6, alternatively referred to as Group VIB, of the Periodic Table of the Elements, at least one metal from Groups 8, 9 or 10, alternatively referred to as Group VIIIB, of the Periodic Table of the Elements, and optionally comprising phosphorous;

wherein the Group 6 metal comprises about 30 to about 45 wt. % and the total of Group 6 and Group 8, 9 or 10 or mixtures thereof metal components comprise about 35 to about 55 wt. %, calculated as oxides and based on the total weight of the catalyst composition;

wherein the metals, and phosphorous when present, are carried on and/or within a porous inorganic oxide carrier or support, the support prior to incorporation of the metals and phosphorus when present, having a total pore volume (TPV) of about 0.8 cc/g to about 1.5 cc/g and comprising:

(a) equal to or greater than about 25% to about 7545% of TPV in pores having a diameter of 100 Angstroms (Å) (10 nm) to 200 Angstroms (Å) (20 nm);

(b) greater than about 15% to less than about 30% of TPV in pores having a diameter of 200 Å (20 nm) to less than 1000 Å (100 nm);

(c) equal to or greater than 10% to less than 30% of TPV in pores having a diameter equal to or greater than 1000 Å (100 nm) to 30,000 Å (3,000 nm); and wherein the supported catalyst comprises:

(d) equal to or greater than about 35% to about 60% of TPV in pores having a diameter of 100 (A) (10 nm) to 200 (A) (20 nm);

(e) greater than about 15% to less than about 30% of TPV in pores having a diameter of 200 Å (20 nm) to less than 1000 Å (100 nm);

(f) equal to or greater than 10% to less than 30% of TPV in pores having a diameter equal to or greater than 1000 Å (100 nm) to 30,000 Å (3,000 nm); and wherein pore properties and contents are measured using mercury porosimetry.

2. A supported catalyst as in paragraph 1 further characterized in that the support exhibits a d50 equal to or greater than 110 Å (11 nm) and equal to or less than about 170 Å (17 nm), or the supported catalyst exhibits a d50 equal to or greater than about 125 Å (12.5 nm) and equal to or less than about 210 Å (21 nm).

3. A supported catalyst as in paragraph 1 further characterized in that greater than about 17% to less than about 28% of TPV of the supported catalyst is in pores having a diameter of 200 Å (20 nm) to less than 1000 Å (100 nm).

4. A supported catalyst as in paragraph 1 further characterized in that equal to or greater than about 12% to less than about 28% of the TPV of the supported catalyst is in pores having a diameter equal to or greater than 1000 Å (100 nm) to 30,000 Å (3,000 nm).

5. A supported catalyst as in paragraph 4 further characterized in that equal to or greater than about 15% to less than about 25% of the TPV is in pores having a diameter equal to or greater than 1000 Å (100 nm) to 30,000 Å (3,000 nm).

6. A supported catalyst as in paragraph 1 further characterized in that about 40% to about 55% of the TPV is in pores having a diameter of 100 Å (10 nm) to 200 Å (20 nm).

7. A supported catalyst as in paragraph 1 wherein the support is selected from silica, silica gel, silica-alumina, alumina, alumina with silica-alumina dispersed therein, alumina-coated silica, silica-coated alumina, titania, titania-alumina, zirconia, boria, terrana, kaolin, magnesium silicate, magnesium carbonate, magnesium oxide, aluminum oxide, precipitated aluminum oxide, activated alumina, bauxite, kieselguhr, pumice, natural clay, synthetic clay, cationic clay, or anionic clay and mixtures thereof.

8. A supported catalyst as in paragraph 1 further characterized in that the metal of Group 6 is molybdenum and the metal of Group 8, 9 or 10 is selected from the group consisting of cobalt, nickel and mixtures thereof 9. A supported catalyst as in paragraph 8 further comprising phosphorous.

10. A supported catalyst as in paragraph 1 useful in at least one process selected from the group consisting of:
(I) hydroprocessing a petroleum feed;
(II) hydrocracking (HCR) of a petroleum feedstock;
(III) hydrodearomatization (HDA) of a petroleum feedstock;
(IV) hydrodesulfurization (HDS) of a petroleum feedstock;
(V) hydrodenitrification (HDN) of a petroleum feedstock;
(VI) hydrodemetalation (HDM) of a petroleum feedstock; and
(VII) hydrotreating a charge hydrocarbon feed or petroleum feedstock containing components boiling above 600° F. (315.6° C.), and at least one component components selected from the group consisting of sulfur-containing compounds, nitrogen-containing compounds, metal-containing compounds, asphaltenes, carbon residue, sediment precursors, and mixtures thereof.

11. A supported catalyst as in paragraph 10 wherein the catalyst has been pre-impregnated, shaped, dried and calcined.

12. A supported catalyst as in paragraph 10, further exhibiting a d50 equal to or greater than about 120 Å (12 nm) and equal to or less than about 200 Å (20 nm).

13. A process for treating a hydrocarbon feedstock comprising at least one of paraffin, aromatic and naphthene components to produce treated products, the process selected from the group consisting of:
(I) hydrodemetallation, hydrodenitrification, hydrodesulfurization, and hydrocracking, the process comprising contacting the feedstock in at least one reactor with hydrogen under hydrocracking conditions with a supported catalyst of paragraph 1 and recovering the product;
(II) hydrotreating the hydrocarbon feed containing components boiling above 1000° F. (537.8° C.), and at least one component selected from the group consisting of sulfur-containing compounds, nitrogen-containing compounds, metal-containing compounds, asphaltenes, carbon residue, sediment precursors, and mixtures thereof, comprising contacting the feed with hydrogen and a supported catalyst of paragraph 1 at isothermal or substantially isothermal hydrotreating conditions and recovering the treated product;
(III) hydroconverting the hydrocarbon feed having components exhibiting a boiling point greater than 600° F. (315.6° C.) to form product having an increased proportion of components exhibiting a boiling point less than about 600° F. (315.6° C.) comprising contacting the feed with hydrogen and a supported catalyst of paragraph 1 at isothermal or substantially isothermal hydrotreating conditions and recovering the product; and
(IV) hydroconverting the feed, comprising contacting the feed comprising a hydrocarbon oil with hydrogen and a supported catalyst of paragraph 1 under conditions of elevated temperature above about 600° F. (315.6° C.) and pressure above about 500 p.s.i.g. (3.44 MPa) and recovering the product.

14. The process of paragraph 13 wherein the recovered product following treatment exhibits at least one of a reduced content of aromatic components, increased content of paraffinic components, reduced viscosity and increased viscosity index compared to the untreated hydrocarbon feedstock.

15. A method for preparing a catalyst for use in at least one process selected from the group consisting of:
(I) hydroprocessing a petroleum feedstock;
(II) hydrocracking (HCR) of a petroleum feedstock;
(III) hydrodearomatization (HDA) of a petroleum feedstock;
(IV) hydrodesulfurization (HDS) of a petroleum feedstock;
(V) hydrodenitrification (HDN) of a petroleum feedstock;
(VI) hydrodemetallation (HDM) of a petroleum feedstock; and
(VI) hydrotreating a charge hydrocarbon feed containing components boiling above 600° F. (315.6° C.), and at least one component selected from the group consisting of sulfur-containing compounds, nitrogen-containing compounds, metal-containing compounds, asphaltenes, carbon residue, sediment precursors, and mixtures thereof; the method comprising impregnating a porous inorganic oxide support with an aqueous solution comprising at least one catalytic agent or catalytic agent precursor selected from the group consisting of compounds of Group 6, alternatively referred to as Group VIB, of the Periodic Table of the Elements, and at least one catalytic agent or catalytic agent precursor selected from the group consisting of compounds of Groups 8, 9 or 10, alternatively referred to as Group VIII, of the Periodic Table of the Elements, and optionally comprising a phosphorous-containing compound and at least one organic chelating compound, the Group VIB and Group VIIIB and phosphorus compounds being thermally decomposable or oxidizable in the presence of an oxygen-containing atmosphere to their corresponding oxides and thereafter drying and calcining the resulting impregnated support, the support having been prepared by:
(A) mixing alumina-containing powder with water and optionally nitric acid to form a damp mix;
(B) shaping the damp mix so as to form carrier particles suitable for use in a hydroprocessing reactor; and
the carrier comprising porous alumina having a total pore volume (TPV) of about 0.6 cc/g to about 1.1 cc/g and the following pore size distribution and pore content corresponding to values as measured by the mercury porosimetry method:
the support comprising a porous inorganic oxide having a total pore volume (TPV) of about 0.8 cc/g to about 1.5 cc/g and the following pore size distribution and pore content corresponding to values as measured using mercury porosimetry:
(i) equal to or greater than 25% to 45% of TPV in pores having a diameter of 100 Å (10 nm) to 200 Å (20 nm);
(ii) greater than 15% to less than 30% of TPV in pores having a diameter of 200 Å (20 nm) to less than 1000 Å (100 nm); and
(iii) equal to or greater than 10% to less than 30% of the pore volume in pores having a diameter equal to or greater than 1000 Å (100 nm) (100 nm) to 30,000 Å (3,000 nm).

16. The method of paragraph 15, wherein following step (B) for preparing the support, (C) drying and calcining the support particles to form calcined pills.

17. The method of paragraph 15 wherein the aqueous solution contains an organic chelating compound selected from acetic acid, citric acid, tartaric acid, oxalic acid, maleic acid, malonic acid, malic acid, butanediol, pyruvic aldehyde, glycol aldehyde, acetaldol, tartaric acid, ethylene glycol, propylene glycol, glycerin, trimethylol ethane, trimethylol propane, diethylene glycol, dipropylene glycol, trimethylene glycol, triethylene glycol, tributylene glycol, tetraethylene glycol, tetrapentylene glycol, polyethylene glycol, ethylene glycol monobutyl ether, diethylene glycol monomethyl ether, diethylene glycol monoethyl ether, diethylene glycol monopropyl ether, and diethylene glycol monobutyl ether and mixtures thereof.

18. The method of paragraph 17 wherein the organic chelating compound comprises citric acid.

19. The method of paragraph 15 wherein the alumina-containing powder in step (A) is silica-alumina.

20. A porous inorganic oxide carrier or support, having a total pore volume (TPV) of about 0.8 cc/g to about 1.5 cc/g and comprising:
(a) equal to or greater than about 25% to about 45% of TPV in pores having a diameter of 100 Angstroms (Å) (10 nm) to 200 Å (20 nm);
(b) greater than about 15% to less than about 30% of TPV in pores having a diameter of 200 Å (20 nm) to less than 1000 Å (100 nm);
(c) equal to or greater than 10% to less than 30% of TPV in pores having a diameter of 1000 Å (100 nm) to 30,000 Å (3,000 nm).

21. The porous inorganic oxide carrier or support of paragraph 20 wherein the support is selected from silica, silica gel, silica-alumina, alumina, alumina with silica-alumina dispersed therein, alumina-coated silica, silica-coated alumina, titania, titania-alumina, zirconia, boria, terrana, kaolin, magnesium silicate, magnesium carbonate, magnesium oxide, aluminum oxide, precipitated aluminum oxide, activated alumina, bauxite, kieselguhr, pumice, natural clay, synthetic clay, cationic clay, or anionic clay and mixtures thereof.

22. The porous inorganic oxide carrier or support of paragraph 20 wherein the support exhibits a d50 equal to or greater than 110 Å (11 nm) and equal to or less than about 170 Å (17 nm).

23. The porous inorganic oxide carrier or support of paragraph 20 having total surface area determined by nitrogen adsorption using the BET technique, of about 185 m$^2$/g up to about 425 m$^2$/g.

24. The porous inorganic oxide carrier or support of claim 20 having greater than about 55% to about 75% of pores having diameters of less than 200 Å (20 nm) measured using the mercury penetration method.

25. The porous inorganic oxide carrier or support of paragraph 20 comprising $Al_2O_3$ and $SiO_2$ having about 85 wt % to about 98 wt % $Al_2O_3$ and about 15 wt % to about 2 wt % $SiO_2$.

All documents described herein are incorporated by reference herein, including any patent applications and/or testing procedures. The principles, preferred embodiments, and modes of operation of the present invention have been described in the foregoing specification.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed:

$$R=R_L+k(R_U-R_L),$$

wherein k is a variable ranging from 1% to 100% with a 1% increment, e.g., k is 1%, 2%, 3%, 4%, 5% . . . . 50%, 51%, 52% . . . . 95%, 96%, 97%, 98%, 99%, or 100%. Moreover, any numerical range represented by any two values of R, as calculated above is also specifically disclosed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

ACRONYMS

| ACRONYM | MEANING |
|---|---|
| API | American Petroleum Institute |
| AQ, LAQ | Asymmetric quadrilobe |
| BET | Brunauer_Emmett-Teller |
| BSU | Bench Scale Unit |
| CBD | Compacted Bulk Density |
| HCGO | Heavy Coker Gas Oil |
| HCR | Hydrocracking |
| HDA | Hdyrodearomatization |
| HDM | Hydrodemetallation |
| HDN | Hydrodenitrification |
| HDS | Hydrodesulfurization |
| HDT | Hydrotreat |
| HPS1 | High Pressure Separator #1 |
| LOI | Loss on Ignition |
| MU | Makeup |
| P/N/A | Paraffins/Naphthenes/Aromatics |
| PSD | Pore size distribution |
| PV | Pore Volume |
| SSA | Specific Surface Area |
| STB | Stripper Bottoms |
| STO | Stripper Overhead |
| TIV | Total Intrusion Volume |
| TPV | Total Pore Volume |
| VI | Viscosity Index |
| Vis | Viscosity |
| VGO | Vacuum Gas Oil |
| WLP | Whole Liquid Product |

Other embodiments are set forth in the following claims.

What is claimed is:

1. A supported catalyst comprising at least one metal from Group 6, alternatively referred to as Group VIB, of the Periodic Table of the Elements, at least one metal from Groups 8, 9 or 10, alternatively referred to as Group VIIIB, of the Periodic Table of the Elements, and optionally comprising phosphorous;

wherein the Group 6 metal comprises about 30 to about 45 wt. % and the total of Group 6 and Group 8, 9 or 10 or mixtures thereof metal components comprise about 35 to about 55 wt. %, calculated as oxides and based on the total weight of the catalyst composition;

wherein the metals, and phosphorous when present, are carried on and/or within a porous inorganic oxide carrier or support, the support prior to incorporation of the metals and phosphorus when present, having a total pore volume (TPV) of about 0.8 cc/g to about 1.5 cc/g and comprising:

(a) equal to or greater than about 25% to about 45% of TPV in pores having a diameter of 100 Angstroms (Å) (10 nm) to 200 Å (20 nm);

(b) greater than about 15% to less than about 30% of TPV in pores having a diameter of 200 Å (20 nm) to less than 1000 Å (100 nm);

(c) equal to or greater than 10% to less than 30% of TPV in pores having a diameter of 1000 Å (100 nm) to 30,000 Å (3,000 nm); and wherein the supported catalyst comprises:

(d) equal to or greater than about 35% to about 60% of TPV in pores having a diameter of 100 Å (10 nm) to 200 Å (20 nm);

(e) greater than about 15% to less than about 30% of TPV in pores having a diameter of 200 Å (20 nm) to less than 1000 Å (100 nm);

(f) equal to or greater than 10% to less than 30% of TPV in pores having a diameter of 1000 Å (100 nm) to 30,000 Å (3,000 nm); and wherein pore properties and contents are measured using mercury porosimetry.

2. The supported catalyst of claim 1, wherein the support exhibits a $d_{50}$ equal to or greater than 110 Å (11 nm) and equal to or less than about 170 Å (17 nm), or the supported catalyst exhibits a $d_{50}$ equal to or greater than about 125 Å (12.5 nm) and equal to or less than about 210 Å (21 nm).

3. The supported catalyst of claim 1, wherein greater than about 17% to less than about 28% of TPV of the supported catalyst is in pores having a diameter of 200 Å to less than 1000 Å.

4. The supported catalyst of claim 1, wherein equal to or greater than about 12% to less than about 28% of the TPV of the supported catalyst is in pores having a diameter of 1000 Å (100 nm) to 30,000 Å (3,000 nm).

5. The supported catalyst of claim 4, wherein equal to or greater than about 15% to less than about 25% of the TPV is in pores having a diameter of 1000 Å (100 nm) to 30,000 Å (3,000 nm).

6. The supported catalyst of claim 1, wherein about 40% to about 55% of the TPV is in pores having a diameter of 100 Å (10 nm) to 200 Å (20 nm).

7. The supported catalyst of claim 1, wherein the support is silica, silica gel, silica-alumina, alumina, alumina with silica-alumina dispersed therein, alumina-coated silica, silica-coated alumina, titania, titania-alumina, zirconia, boria, terrana, kaolin, magnesium silicate, magnesium carbonate, magnesium oxide, aluminum oxide, precipitated aluminum oxide, activated alumina, bauxite, kieselguhr, pumice, natural clay, synthetic clay, cationic clay, anionic clay, or a mixture of any two or more thereof.

8. The supported catalyst of claim 1, wherein the metal of Group 6 is Mo, and the metal of Group 8, 9, or 10 is selected from the group consisting of Co, Ni, and mixtures thereof.

9. The supported catalyst of claim 8 further comprising phosphorous.

10. The supported catalyst of claim 1 useful in at least one process that is:
hydroprocessing a petroleum feedstock;
hydrocracking (HCR) of a petroleum feedstock;
hydrodearomatization (HDA) of a petroleum feedstock;
hydrodesulfurization (HDS) of a petroleum feedstock;
hydrodenitrification (HDN) of a petroleum feedstock;
hydrodemetallation (HDM) of a petroleum feedstock; or
hydrotreating of a charged hydrocarbon feed or petroleum feedstock containing components boiling above 600° F. (315.6° C.), and at least one component components selected from the group consisting of sulfur-containing compounds, nitrogen-containing compounds, metal-containing compounds, asphaltenes, carbon residue, sediment precursors, and mixtures thereof.

11. The supported catalyst of claim 10, wherein the catalyst has been pre-impregnated, shaped, dried and calcined.

12. A process for treating a hydrocarbon feedstock comprising at least one of paraffin, aromatic and naphthene components to produce treated products, the process selected from the group consisting of:
(I) hydrodemetallation, hydrodenitrification, hydrodesulfurization, hydrodearomatization, and hydrocracking, the process comprising contacting the feedstock in at least one reactor with hydrogen under hydroprocessing or hydrocracking conditions with a supported catalyst of claim 1 and recovering the product;
(II) hydrotreating the hydrocarbon feed containing components boiling above 1000° F., and at least one component selected from the group consisting of sulfur-containing compounds, nitrogen-containing compounds, metal-containing compounds, asphaltenes, carbon residue, sediment precursors, and mixtures thereof, comprising contacting the feed with hydrogen and a supported catalyst of claim 1 at isothermal or substantially isothermal hydrotreating conditions and recovering the treated product;
(III) hydroconverting the hydrocarbon feed having components exhibiting a boiling point greater than 600° F. (315.6° C.) to form product having an increased proportion of components exhibiting a boiling point less than about 600° F. (315.6° C.) comprising contacting the feed with hydrogen and a supported catalyst of claim 1 at isothermal or substantially isothermal hydrotreating conditions and recovering the product; and
(IV) hydroconverting the feed, comprising contacting the feed comprising a hydrocarbon oil with hydrogen and a supported catalyst of claim 1 under conditions of elevated temperature above about 600° F. (315.6° C.) and pressure above about 500 p.s.i.g. (3.44 MPa) and recovering the product.

13. The process of claim 12, wherein the recovered product following treatment exhibits at least one of a reduced content of aromatic components, increased content of paraffinic components, reduced viscosity and increased viscosity index compared to the untreated hydrocarbon feedstock.

14. A method for preparing a catalyst for use in at least one process selected from the group consisting of:
(I) hydroprocessing a petroleum feed;
(II) hydrocracking (HCR) of a petroleum feedstock;
(III) hydrodesulfurization of hydrocarbons;
(IV) hydrodenitrification of hydrocarbons;
(V) hydrodearomatization (HDA) of a petroleum feedstock;
(VI) hydrodemetallation of hydrocarbons; and
(VII) hydrotreating a charge hydrocarbon feed containing components boiling above 600° F. (315.6° C.), and at least one component selected from the group consisting of sulfur-containing compounds, nitrogen-containing compounds, metal-containing compounds, asphaltenes, carbon residue, sediment precursors, and mixtures thereof,
the method comprising impregnating a porous inorganic oxide support with an aqueous solution comprising at least one catalytic agent or catalytic agent precursor selected from the group consisting of compounds of Group 6, alternatively referred to as Group VIB, of the Periodic Table of the Elements, and at least one catalytic agent or catalytic agent precursor selected from the group consisting of compounds of Groups 8, 9 or 10, alternatively referred to as Group VIII, of the Periodic Table of the Elements, and optionally comprising a phosphorous-containing compound and at least one organic chelating compound, the Group VIB and Group VIIIB and phosphorus compounds being thermally decomposable or oxidizable in the presence of an oxygen-containing atmosphere to their corresponding oxides and thereafter drying and calcining the resulting impregnated support, the support having been prepared by:
mixing alumina-containing powder with water and optionally nitric acid to form a damp mix;
shaping the damp mix so as to form support particles suitable for use in a hydroprocessing reactor; and the support comprising a porous inorganic oxide having a total pore volume (TPV) of about 0.8 cc/g to about 1.5 cc/g and, prior to incorporation of the metals and phosphorus when present having the following pore size distribution and pore content corresponding to values as measured using mercury porosimetry:

equal to or greater than 25% to 45% of TPV in pores having a diameter of 100 Å (10 nm) to 200 Å (20 nm);

greater than 15% to less than 30% of TPV in pores having a diameter of 200 Å (20 nm) to less than 1000 Å (100 nm); and equal to or greater than 10% to less than 30% of the pore volume in pores having a diameter of 1000 Å (100 nm) to 30,000 Å (3,000 nm).

15. The method of claim 14 further comprising after shaping, drying and calcining the support particles to form calcined pills.

16. The method of claim 14, wherein the aqueous solution contains an organic chelating compound that is acetic acid, citric acid, tartaric acid, oxalic acid, maleic acid, malonic acid, malic acid, butanediol, pyruvic aldehyde, glycol aldehyde, acetaldol, tartaric acid, ethylene glycol, propylene glycol, glycerin, trimethylol ethane, trimethylol propane, diethylene glycol, dipropylene glycol, trimethylene glycol, triethylene glycol, tributylene glycol, tetraethylene glycol, tetrapentylene glycol, polyethylene glycol, ethylene glycol monobutyl ether, diethylene glycol monomethyl ether, diethylene glycol monoethyl ether, diethylene glycol monopropyl ether, diethylene glycol monobutyl ether, or a mixture of any two or more thereof.

17. The method of claim 14, wherein the alumina-containing powder is silica-alumina.

18. A porous inorganic oxide carrier or support, having a total pore volume (TPV) of about 0.8 cc/g to about 1.5 cc/g and comprising:

equal to or greater than about 25% to about 45% of TPV in pores having a diameter of 100 Angstroms (Å) (10 nm) to 200 Å (20 nm);

greater than about 15% to less than about 30% of TPV in pores having a diameter of 200 Å (20 nm) to less than 1000 Å (100 nm); and equal to or greater than 10% to less than 30% of TPV in pores having a diameter of 1000 Å (100 nm) to 30,000 Å (3,000 nm).

19. The porous inorganic oxide carrier or support of claim 18 wherein the support is silica, silica gel, silica-alumina, alumina, alumina with silica-alumina dispersed therein, alumina-coated silica, silica-coated alumina, titania, titania-alumina, zirconia, boria, terrana, kaolin, magnesium silicate, magnesium carbonate, magnesium oxide, aluminum oxide, precipitated aluminum oxide, activated alumina, bauxite, kieselguhr, pumice, natural clay, synthetic clay, cationic clay, anionic clay, or a mixture of any two or more thereof.

20. The porous inorganic oxide carrier or support of claim 18 wherein one or more of the following:

(i) the support exhibits a $d_{50}$ equal to or greater than 110 Å (11 nm) and equal to or less than about 170 Å (17 nm);

(ii) the porous inorganic oxide carrier or support has a total surface area determined by nitrogen adsorption using the BET technique, of about 185 m$^2$/g up to about 425 m$^2$/g;

(iii) the porous inorganic oxide carrier or support has greater than about 55% to about 75% of pores having diameters of less than 200 Å (20 nm) measured using the mercury penetration method; and (iv) the porous inorganic oxide carrier or support comprises $Al_2O_3$ and $SiO_2$ having about 85 wt % to about 98 wt % $Al_2O_3$ and about 15 wt % to about 2 wt % $SiO_2$.

* * * * *